United States Patent [19]
Oka et al.

[11] Patent Number: 5,780,856
[45] Date of Patent: Jul. 14, 1998

[54] RADIATION DETECTOR AND METHOD OF DETECTING RADIATION

[75] Inventors: Toru Oka; Kazunori Ikegami; Kiyoshi Yoda, all of Tokyo, Japan

[73] Assignee: Mitsubishi Denki Kabushiki Kaisha, Tokyo, Japan

[21] Appl. No.: 634,677

[22] Filed: Apr. 18, 1996

[30] Foreign Application Priority Data

Apr. 27, 1995 [JP] Japan ................................. 7-104363
Apr. 4, 1996 [JP] Japan ................................. 8-082844

[51] Int. Cl.$^6$ ................................................. G01T 1/20
[52] U.S. Cl. ........................ 250/367; 250/366; 250/368
[58] Field of Search ................................ 250/368, 367, 250/366

[56] References Cited

U.S. PATENT DOCUMENTS

| | | | |
|---|---|---|---|
| 3,978,337 | 8/1976 | Nickles et al. | 250/367 |
| 4,788,436 | 11/1988 | Koechner | 250/485.1 |
| 4,942,302 | 7/1990 | Koechner | 250/368 |
| 5,313,065 | 5/1994 | Reed | 250/368 |

FOREIGN PATENT DOCUMENTS 63-307382  2/1988  Japan ................................. 250/368

OTHER PUBLICATIONS

"Temperature Dependence of BGO–Cs(Tl) Phoswich Detector Properties" by Piro et al, Nuclear Instruments and Methods in Physics Research aA257 (187) pp. 429–435 no date.

Measurement of Spatial dose–rate distribution using a position sensitive detector, KEK Proc., 94–7 (1994), pp. 119–125 no month.

Electromagnetic field source search from the local field measurement on International Journal of Applied Electromagnetics in Materials 3 (1993), pp. 297–306. No month.

*Primary Examiner*—Constantine Hannaher
*Attorney, Agent, or Firm*—Sughrue, Mion, Zinn, Macpeak & Seas, PLLC

[57] ABSTRACT

A radiation detecting section including scintillation fibers is arranged in a one-dimensional, two-dimensional or three-dimensional manner. A multichannel amplitude analyzer can obtain an incident position of radiation in the radiation detecting section, and a radiation dose rate at the incident position depending upon a signal having amplitude according to a difference in arrival time between two input signals. A microcomputer carries out inverse problem analysis to estimate a radiation source distribution or a spatial radiation intensity distribution.

15 Claims, 12 Drawing Sheets

RADIATION DETECTOR AND METHOD OF DETECTING RADIATION

BACKGROUND OF THE INVENTION

1. Field of the Invention

The present invention relates to a radiation detector and a radiation detecting method used in an environment requiring radiation monitoring such as a radiation controlled area, to detect a radiation incident position or a radiation dose rate by using a scintillation fiber so as to detect a one-dimensional, two-dimensional or three-dimensional radiation distribution depending upon the result of detection.

2. Description of the Prior Art

FIG. 21 is a block diagram showing a conventional distribution-type radiation detector using a scintillation fiber, disclosed in, for example, "Radiation Detectors and their Uses" summary collection, National Laboratory for High Energy Physics, Japan (Jan. 26, 1994). In the drawing, reference numeral 1503 designates a scintillation fiber to cause fluorescence in response to incidence of radiation, 103a and 103b are photo detectors connected to both ends of the scintillation fiber 1503, 104a and 104b are amplifiers to amplify electric pulses outputted from the photo detectors 103a and 103b, 105a and 105b are constant fraction discriminators to shape waveforms of signals outputted from the amplifiers 104a and 104b, 106a is a delay circuit to delay a signal outputted from the one constant fraction discriminator 105b, 107a is a time-to-amplitude converter to generate a signal having amplitude according to a difference in arrival time between two input signals, 108a is an A-D converter for A-D conversion of output from the time-to-amplitude 107a, and 109a is a multichannel amplitude analyzer to carry out amplitude discrimination depending upon output from the A-D converter 108a.

Further, FIG. 21 shows collimated radiation 1501, and light pulses 1502a and 1502b generated by the fluorescence caused in the scintillation fiber 1503.

A description will now be given of the operation.

When the radiation 1501 is incident on the scintillation fiber 1503, the fluorescence is caused in the scintillation fiber 1503. The caused fluorescence is propagated as the light pulses 1502a and 1502b to both the ends of the scintillation fiber 1503. When the respective light pulses 1502a and 1502b are inputted into the photo detectors 103a and 103b, the photo detectors 103a and 103b convert the light pulses 1502a and 1502b into electric pulses. The electric pulses are inputted into the constant fraction discriminators 105a and 105b after amplification in the amplifiers 104a and 104b. The constant fraction discriminators 105a and 105b shape waveforms of the input signals.

The time-to-amplitude converter 107a can directly take as input a signal outputted from the one constant fraction discriminator 105a. Further, the time-to-amplitude converter 107a can take as input, through the signal delay circuit 106a, a signal outputted from the other constant fraction discriminator 105b. The time-to-amplitude converter 107a outputs a signal having amplitude according to a difference in arrival time between the two signals. In this case, the signal delay circuit 106a is mounted to ensure that the one signal outputted from the constant fraction discriminator 105a can reach the time-to-amplitude converter 107a earlier than the other signal from the constant fraction discriminator 105b irrespective of a position of the scintillation fiber 1503 on which the radiation 1501 is incident.

The A-D converter 108a carries out A-D conversion of the signal outputted from the time-to-amplitude converter 107a, thereafter supplying the converted signal to the multichannel amplitude analyzer 109a. The multichannel amplitude analyzer 109a specifies an incident position of the radiation depending upon amplitude of the input signal. In the signal inputted into the multichannel amplitude analyzer 109a, the amplitude is proportional to a difference between time intervals for which the light pulses 1502a and 1502b can respectively reach the photo detectors 103a and 103b. The difference in arrival time corresponds to the incident position of the radiation 1501 on the scintillation fiber 1503. Thus, the multichannel amplitude analyzer 109a can specify the incident position of the radiation depending upon the amplitude of the input signal.

Even when radiations are incident on a plurality of positions of the scintillation fiber 1503, the multichannel amplitude analyzer 109a can recognize the incident positions of the radiations by carrying out amplitude discrimination. Alternatively, it is possible to detect a dose rate (incident radiation dose per unit time) depending upon a count value of pulse.

The conventional radiation detector has the above structure. Consequently, there are problems in that available information is only a one-dimensional radiation distribution on the scintillation fiber 1503, and a two-dimensional or three-dimensional radiation distribution (a radiation source distribution and a spatial radiation intensity distribution) can not be obtained in the environment having the scintillation fiber 1503. In addition, it is impossible that one-dimensional radiation distribution in a wide range space is detected.

Though the two-dimensional or three-dimensional radiation distribution can be obtained by using a lot of radiation detectors shown in FIG. 21, this method results in higher cost. Besides, since the scintillation fiber has, for example, a poor transmission characteristic, it is difficult to measure a radiation distribution in a wide range.

SUMMARY OF THE INVENTION

The present invention is made to overcome the above problems, and it is a main object of the invention to provide a radiation detector and a method of detecting radiation, in which a one-dimensional, two-dimensional or three-dimensional radiation distribution obtained at a low cost, and improved safety can be provided in, for example, a radiation controlled area.

Further, additional objects of the present invention are to provide the following radiation detector or method of detecting radiation:

(1) A radiation detector in which it is possible to decrease the number of variables required for inverse problem analysis of radiation information, and reduce an error of the result of radiation source estimation, and a time for analysis;

(2) A radiation detector in which it is possible to reduce a loss of a light pulse generated in a scintillation fiber, and realize radiation measurement of in a wide range;

(3) A radiation detector in which it is possible to easily compensate for a loss of a light pulse generated in a scintillation fiber;

(4) A radiation detector in which it is possible to increase a quantity of light of a light pulse generated in a scintillation fiber;

(5) A radiation detector in which a light pulse from a scintillation fiber can be transmitted to a transmission optical fiber at high efficiency;

(6) A radiation detector in which it is possible to improve a radiation capture efficiency in a scintillation fiber;

3

(7) A radiation detector in which it is possible to enhance a reaction efficiency of light with high energy radiation in a scintillation fiber, and improve sensitivity required to detect radiation energy;

(8) A radiation detector in which it is possible to introduce a light pulse from a scintillation fiber to a transmission optical fiber at higher efficiency;

(9) A method of detecting radiation, in which a radiation distribution can be detected with high accuracy according to inverse problem analysis of radiation information;

(10) A method of detecting radiation, in which it is possible to estimate a position of a radiation source with high accuracy according to inverse problem analysis of radiation information by using a measured value and a calculated value; and

(11) A method of detecting radiation, in which it is possible to easily check a position of a radiation source.

In a radiation detector according to the present invention, a radiation detecting section including scintillation fibers is arranged in a two-dimensional or three-dimensional manner.

A radiation detecting section may include a one-dimensional radiation detecting portion having a plurality of scintillation fibers in various combinations.

Further, a radiation detector may include analyzing means for carrying out inverse problem analysis depending upon an incident position of radiation and a radiation dose rate at the incident position found by a radiation analyzer so as to estimate a radiation source distribution or a spatial radiation intensity distribution.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

4

Figure 10:
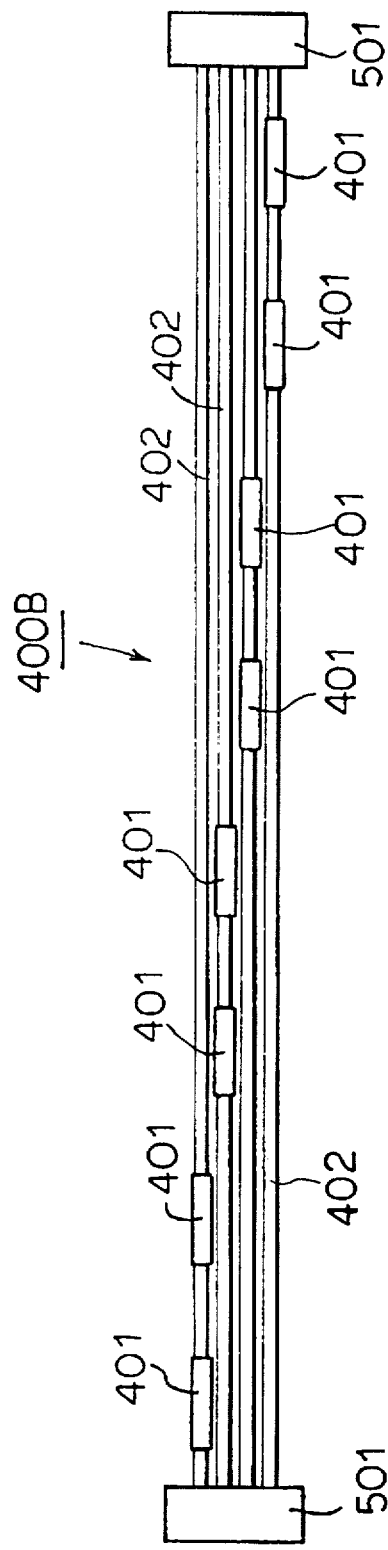
Figure 11:
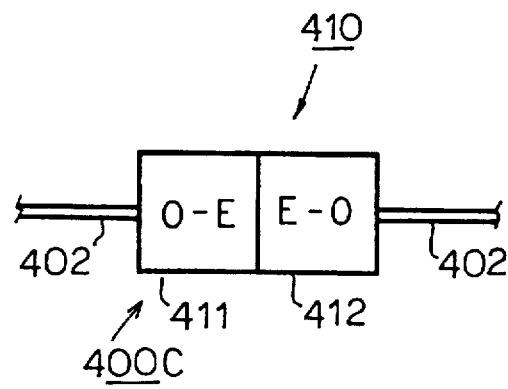
Figure 12:
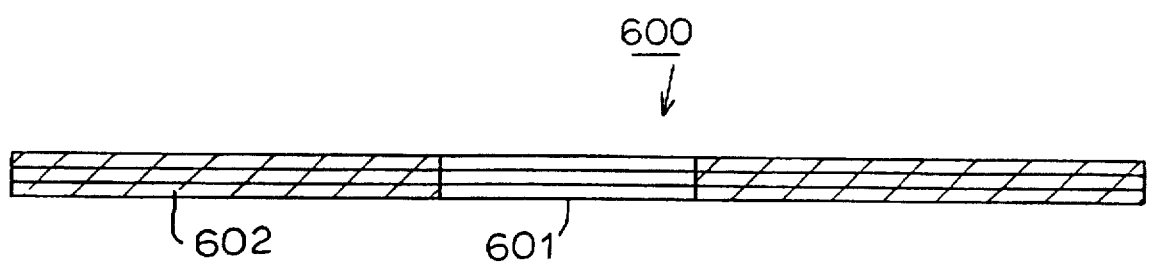
Figure 13:
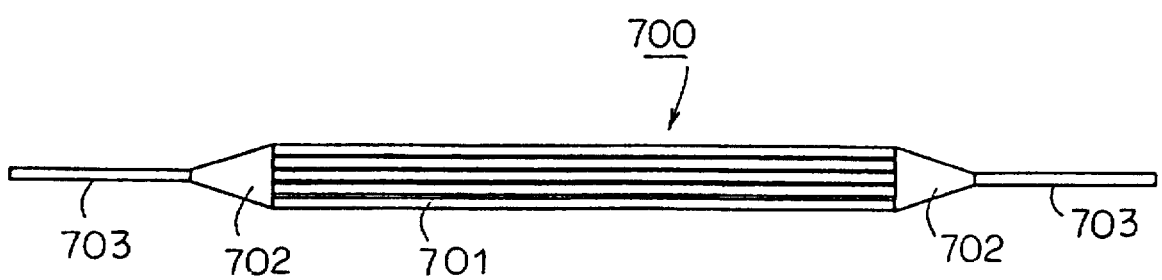
Figure 14:
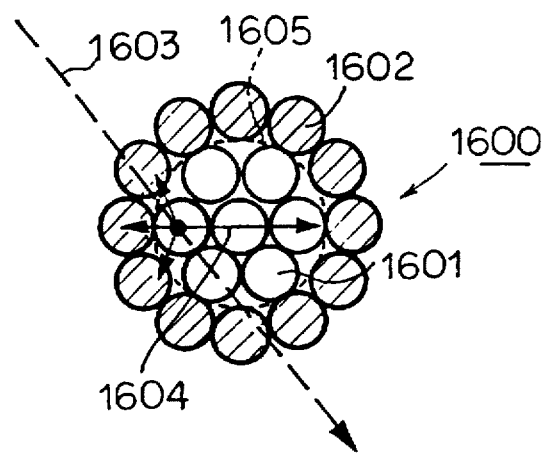
Figure 15:
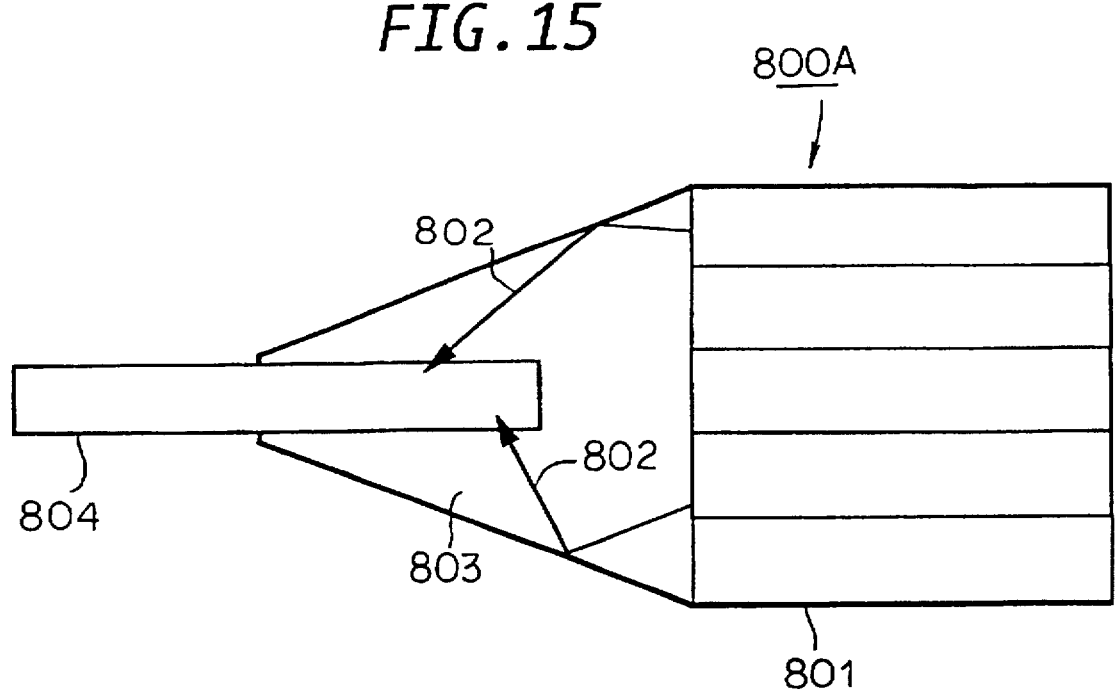
Figure 16:
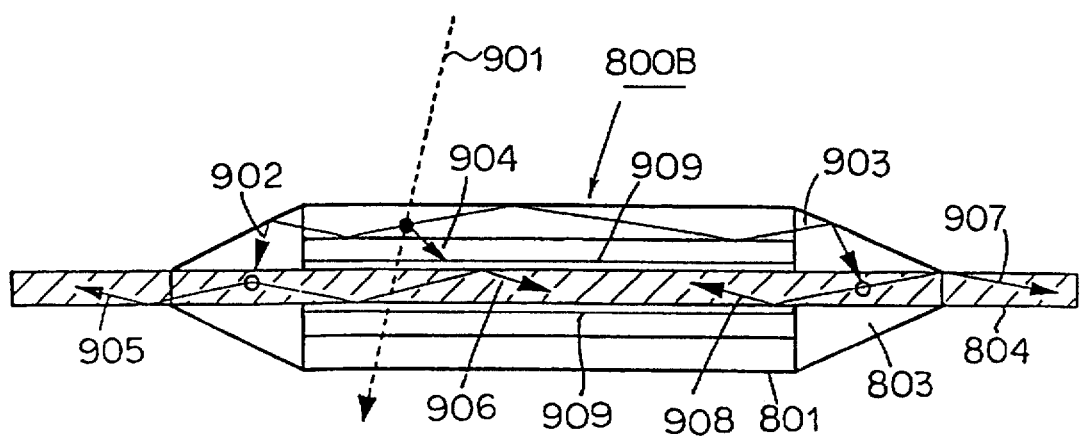
Figure 19:
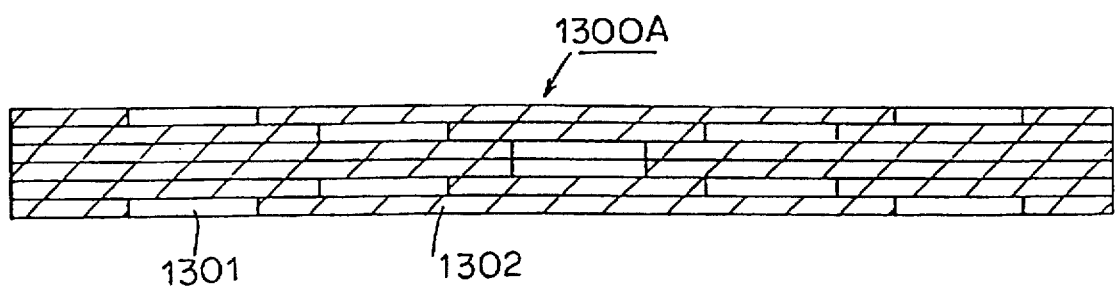
Figure 20:
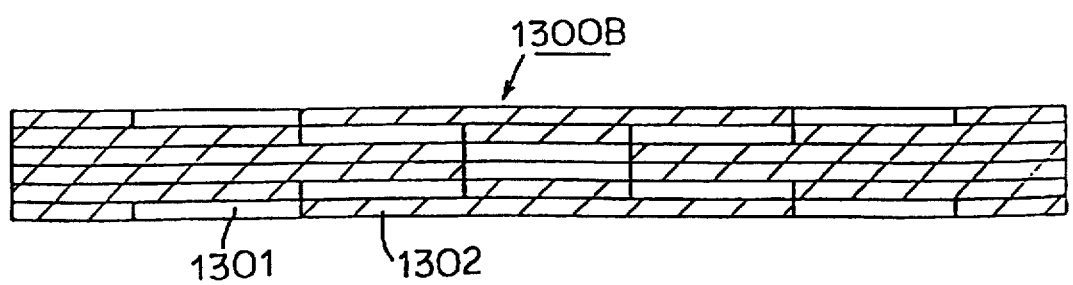
Figure 17:
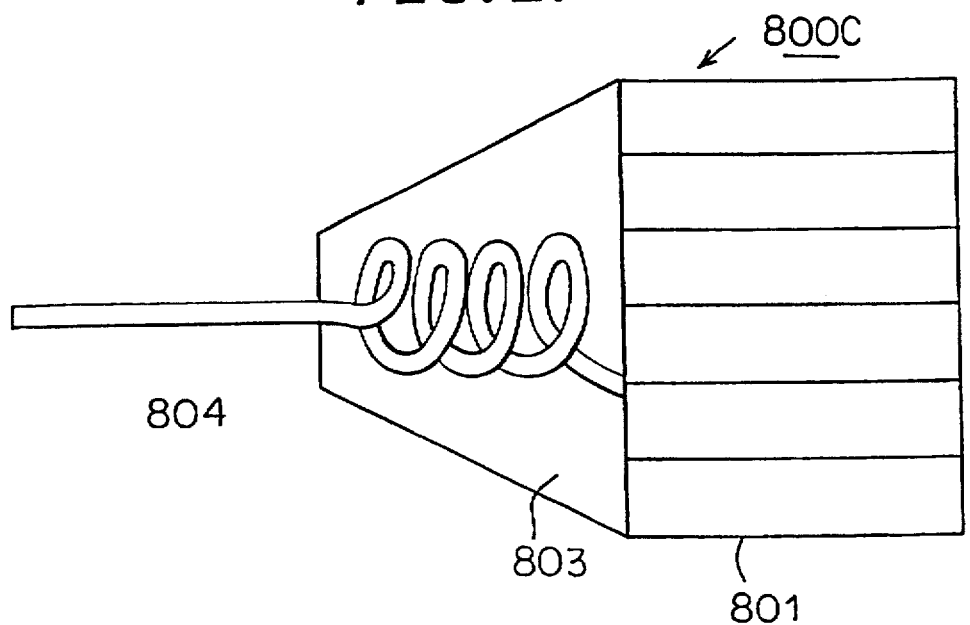
Figure 18:
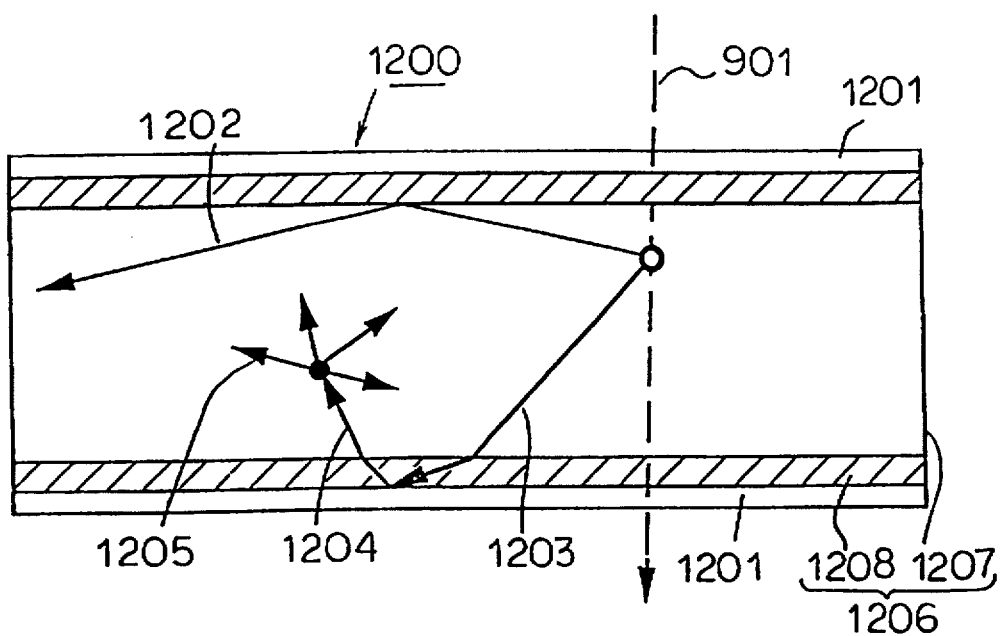
Figure 21:
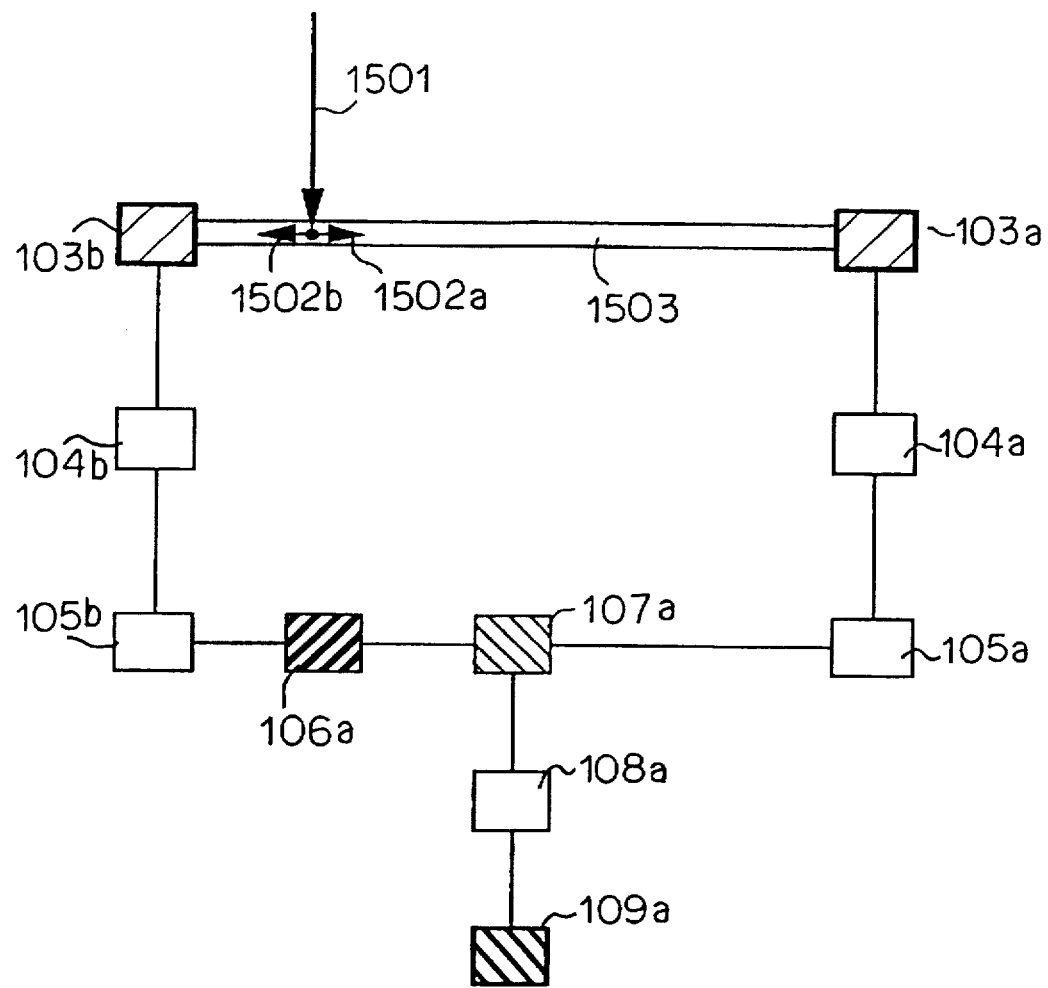

FIG. 10 is a front view showing an essential part of a radiation detector according to the eighth embodiment of the present invention;

FIG. 11 is a block diagram showing an essential part of a radiation detector according to the ninth embodiment of the present invention;

FIG. 12 is a front view showing an essential part of a radiation detector according to the tenth embodiment of the present invention;

FIG. 13 is a sectional view showing an essential part of a radiation detector according to the eleventh embodiment of the present invention;

FIG. 14 is a sectional view showing a radiation detecting portion using scintillation fibers in a radiation detector according to the twelfth embodiment of the resent invention;

FIG. 15 is a sectional view showing an essential part of a radiation detector according to the thirteenth embodiment of the present invention;

FIG. 16 is a sectional view showing an essential part of a radiation detector according to the fourteenth embodiment of the present invention;

FIG. 17 is a sectional view showing an essential part of a radiation detector according to the fifteenth embodiment of the present invention;

FIG. 18 is a sectional view showing an essential part of a radiation detector according to the sixteenth embodiment of the present invention;

FIG. 19 is a sectional view showing an essential part of a radiation detector according to the seventeenth embodiment of the present invention;

FIG. 20 is a sectional view showing an essential part of a radiation detector according to the eighteenth embodiment of the present invention; and FIG. 21 is a block diagram showing a conventional distribution-type radiation detector.

DETAILED DESCRIPTION OF THE PREFERRED EMBODIMENTS

Preferred embodiments of the invention will now be described referring to the accompanying drawings.

Embodiment 1

Figure 1:
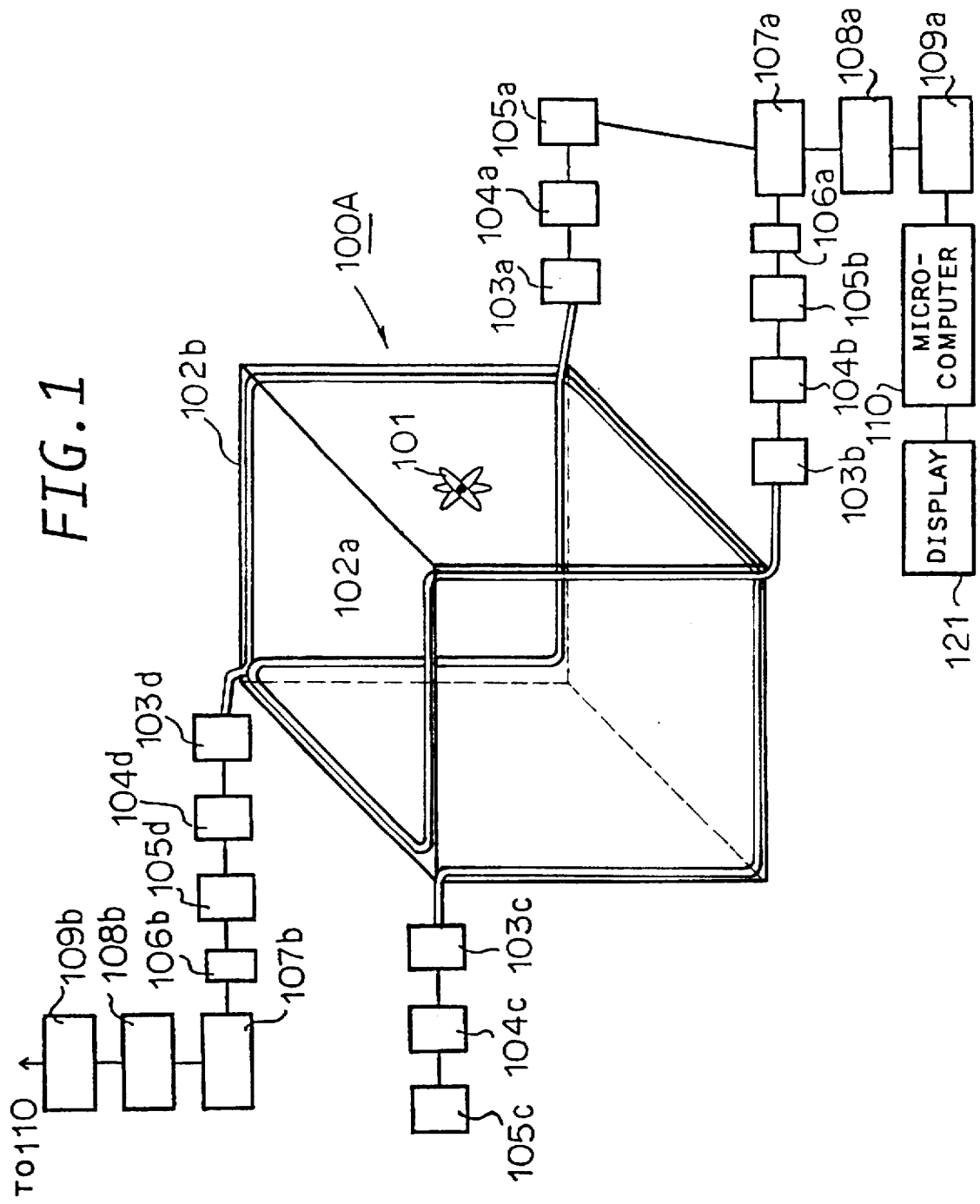
FIG. 1 is a block diagram showing a radiation detector according to the first embodiment of the present invention.

FIG. 1 is a block diagram showing a radiation detector according to the first embodiment of the present invention. In the drawing, reference numeral 101 designates a radiation source serving as a measuring object, and 102a and 102b are scintillation fibers forming radiation detecting portions, respectively arranged in a three-dimensional manner along edges of an environment requiring monitoring, that is, a monitored environment. Reference numerals 103a and 103b designate photo detectors connected to both ends of the scintillation fiber 102a, 103c and 103d are photo detectors connected to both ends of the scintillation fiber 102b. 104a and 104b are amplifiers to amplify electric pulses outputted from the photo detectors 103a and 103b, and 104c and 104d are amplifiers to amplify electric pulses outputted from the photo detectors 103c and 103d. Reference numeral 100A designates a radiation detecting section including the scintillation fibers 102a and 102b.

Reference numerals 105a and 105b mean constant fraction discriminators to shape waveforms of signals outputted from the amplifiers 104a and 104b, and 105c and 105d are constant fraction discriminators to shape waveforms of signals outputted from the amplifiers 104c and 104d. Reference numeral 106a means a signal delay circuit to delay a signal outputted from the constant fraction discriminator 105b, and 106b is a signal delay circuit to delay a signal outputted from the constant fraction discriminator 105d. Reference numeral 107a designates a time-to-amplitude converter to generate a signal having amplitude according to a difference in arrival time between a signal from the constant fraction discriminator 105a and a signal from the signal delay circuit 106a, and 107b is a time-to-amplitude converter to generate a signal having amplitude according to a difference in arrival time between a signal from the constant fraction discriminator 105c and a signal from the signal delay circuit 106b. Reference numerals 108a and 108b designates A-D converters for A-D conversion of output from the time-to-amplitude converters 107a and 107b, and 109a and 109b are multichannel amplitude analyzers to carry out amplitude discrimination depending upon output from the A-D converters 108a and 108b. The multichannel amplitude analyzers 109a and 109b are one examples of a radiation analyzer.

Reference numeral 110 designates a microcomputer to perform inverse problem analysis depending upon output from the multichannel amplitude analyzers 109a and 109b so as to estimate a two-dimensional or three-dimensional radiation source distribution, and 121 is a display such as CRT display to indicate spatial radiation intensity which is obtained through calculation depending upon an estimated position of the radiation source 101 and the estimated two-dimensional or three-dimensional distribution of the radiation source 101. The microcomputer 110 is one example of analyzing means.

A description will now be given of the operation.

The microcomputer 110 estimates the three-dimensional radiation distribution depending upon information about an incident position and the dose of radiation detected by the scintillation fibers 102a and 102b which are arranged in a three-dimensional manner. For this purpose, the microcomputer 110 employs the sampled pattern matching method which is one method for inverse problem analysis.

In the sampled pattern matching method, the monitored environment is spatially divided into some elements, a radiation intensity distribution pattern is calculated for each element assuming that the radiation source 101 exists in the element, and a sequential search is made for a position of the radiation source 101 according to a calculated radiation intensity distribution pattern which is proximate to a measured radiation intensity distribution pattern. Therefore, the search is finished when the degree of agreement is maximized between the measured radiation intensity distribution pattern and the calculated radiation intensity distribution pattern. According to the method, even when there are a plurality of radiation sources 101, their positions can be estimated. Further, depending upon the specified positions of the radiation sources 101, it is possible to obtain a three-dimensional radiation intensity distribution in the monitored environment.

Figure 2:
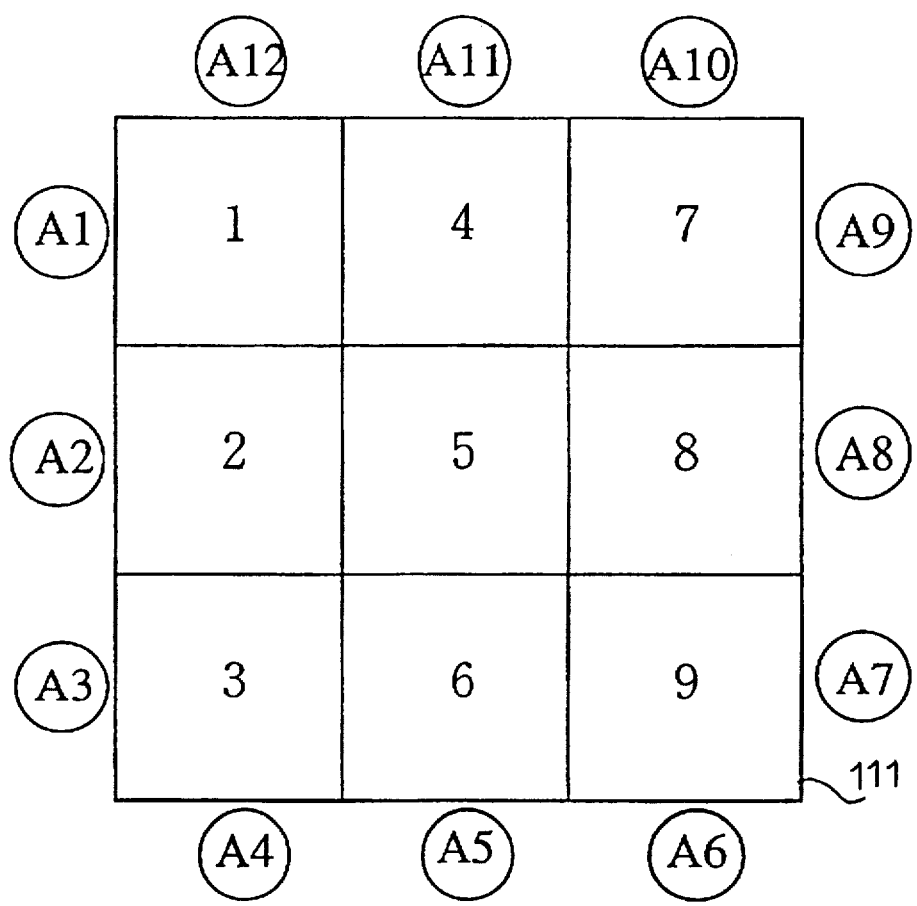
FIG. 2 is an explanatory view showing one illustrative method of dividing an area serving as an object for radiation distribution estimation.

A more specific description will now be given of the sampled pattern matching method. For the sake of simplicity, the method will be described by way of estimation of a two-dimensional distribution as an example. As shown in FIG. 2, an object area 111 serving as an object for estimation of the distribution is divided into nine elements, and the elements are designated by reference numerals 1 to 9. The assumption is made that twelve radiation detecting portions A1 to A12 are mounted along an outer periphery of the object area 111. Radiation intensity is actually measured by the radiation detecting portions A1 to A12, and the results of measurement are defined as a1, a2, . . . a12. In the measured radiation intensity distribution, a pattern vector A is defined as A=(a1, a2, . . . a12).

Subsequently, the assumption is made that a radiation source having unit intensity exists at a center of one element, and a theoretical calculation is carried out to find values which must be measured on the assumption by the radiation detecting portions A1 to A12 disposed on the outer periphery. The values which must be measured, that is, theoretic values are defined as b1, b2, . . . b12, and a pattern vector B is defined as B=(b1, b2, . . . b12) in the calculated radiation intensity distribution. Since radiation intensity is inversely proportional to the square of a distance, the vector B can easily be calculated. Further, the pattern vector B is found assuming that the radiation source having the unit intensity exists at a center of each of the elements. Thereafter, the pattern vector B is found having a direction proximate to that of the measured pattern vector A.

The inner product A·B of the two vectors A and B is expressed as:

$$A \cdot B = \cos\theta \times (|A||B|)$$

Thus, the pattern vector B minimizing θ is found by finding the pattern vector B maximizing the expression:

$$\cos\theta = A \cdot B/|A||B|$$

where |A| and |B| are the magnitudes of the vector A and B.

The assumption may be made that the plurality of radiation sources 101 exist.

Specifically, the number of radiation sources 101 is set to "1," and a position of the radiation source 101 maximizing cosθ is initially checked. It is assumed that the radiation source 101 exists at the position maximizing the cosθ. Subsequently, the number of radiation sources is set to "2." That is, on the assumption that the second radiation source 101 exists at a center of each element, it is checked whether or not there is another position providing cosθ greater than the above cosθ. If there is greater cosθ, it is defined that the second radiation source 101 exists at the position. In subsequent steps, the processing is repeated in which cosθ is checked on the assumption that another radiation source 101 exists at a center of each element until cosθ reaches the maximum value.

Figure 3:
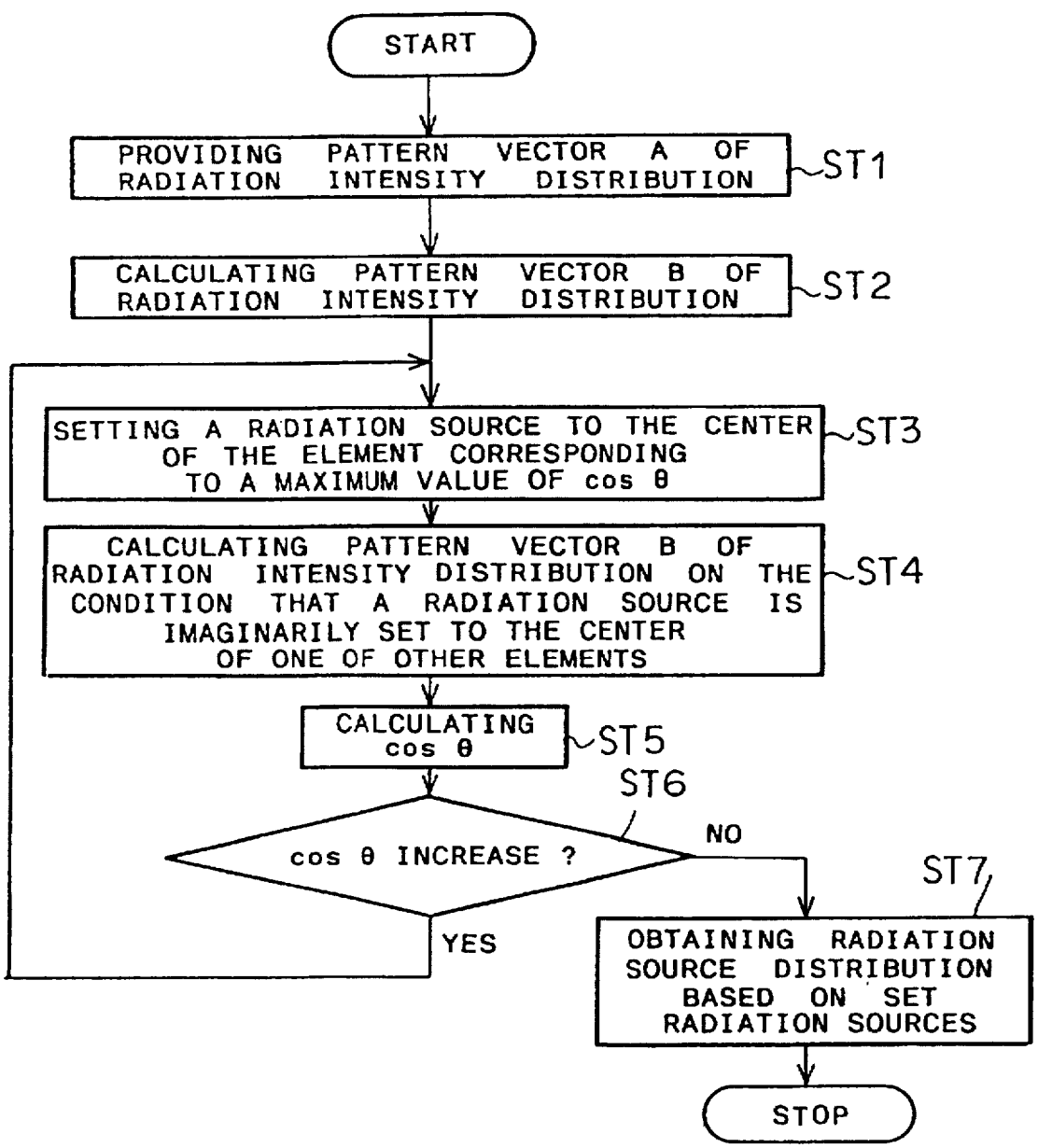
FIG. 3 is a flowchart showing the procedure in the sampled pattern matching method.

FIG. 3 is a flowchart showing the procedure in the sampled pattern matching method when the model shown in FIG. 2 is used. Initially, in the pattern vector measuring step, the pattern vector A is created depending upon the radiation intensity distribution measured by the radiation detecting portion (Step ST1). Subsequently, in the pattern vector creating step, assuming that the radiation source 101 exists at a center of an element i (i=1 to 9), each pattern vector B is created (Step ST2).

Next, in the radiation source setting step, it is determined that the radiation source 101 exists at the center of the element at which the radiation source 101 is assumed to exist when the pattern vector B providing the maximum value of cosθ is created (Step ST3). Further, in the pattern vector calculating step, each pattern vector B is calculated assuming that another radiation source 101 exists at a center of each of the elements other than the element which is determined to have the radiation source 101 (Step ST4).

In the calculating step, cosθ is calculated according to each of the patten vectors B (Step ST5). Further, in the increase deciding step, it is checked whether or not there is another pattern vector B providing cosθ greater than the maximum value of cosθ obtained in Step ST3 (Step ST6). If the pattern vector B can not be found, the operation proceeds to Step ST7. If the pattern vector B is found, the process including Step ST3 and later steps is repeatedly executed. In the radiation source distribution creating step, a radiation source distribution is created by using the positions of the radiation sources 101 determined in Step ST3 (Step ST7).

Though the object area has been divided into the nine elements for the sake of simplicity, the number of elements may be increased to provide higher accurate estimation. Further, in the same processing, a three-dimensional radiation distribution can also be estimated.

In the method, it is assumed that the assumed radiation source 101 has constant intensity in all the elements. Consequently, if the radiation source 101 having higher intensity actually exists, it must be recognized that radiation sources having lower intensity exist at a position of the actual radiation source 101 and in the plurality of elements around the position. Accordingly, an error may possibly be caused in the obtained radiation source distribution in case of a small number of elements. However, it can be considered that the error can be reduced in case of a large number of elements because the positions of the plurality of radiation sources, caused due to the radiation source 101 having higher intensity, are limited to a narrow area.

Next, a description will be given of the operation of the radiation detector shown in FIG. 1. In both of the scintillation fibers 102a and 102b, the same method can be employed to detect the incident position and the dose of the radiation incident on the scintillation fibers 102a and 102b. Thus, only the scintillation fiber 102a will be described in the following.

One radiation is incident on the scintillation fiber 102a to cause fluorescence in the fiber, and light pulses generated by the fluorescence are propagated toward both ends of the fiber. The light pulses are incident on the photo detectors 103a and 103b after propagation through the scintillation fiber 102a. The photo detectors 103a and 103b convert the light pulses into electric pulses. The electrical information from the photo detectors 103a and 103b are amplified in the amplifiers 104a and 104b to be inputted into the constant fraction discriminators 105a and 105b. The constant fraction discriminators 105a and 105b shape the input information to have appropriate waveforms as timing pulses.

In the signal delay circuit 106a, an output signal from the constant fraction discriminator 105b is delayed by n+t and is outputted. Reference numeral n means a time required to propagate the light pulse through the entire scintillation fiber 102a, and t is a time lag required between two signals inputted into the time-to-amplitude converter 107a. That is, reference numeral n means a time to ensure earlier arrival of one signal to the time-to-amplitude converter 107a than the other signal, and t is a time equivalent to a dead time of the time-to-amplitude converter 107a. The time-to-amplitude converter 107a outputs an electric pulse which is proportional to a difference in arrival time between a signal inputted from the constant fraction discriminator 105a and a signal inputted from the signal delay circuit 106a.

The A-D converter 108a feeds a signal from the time-to-amplitude converter 107a to the multichannel amplitude analyzer 109a after A-D conversion of the signal. The multichannel amplitude analyzer 109a counts digital signals from the A-D converter 108a for each amplitude value.

The amplitude value shown by the digital signal from the A-D converter 108a corresponds to the incident position of the radiation, and the number of times the digital signal is inputted corresponds to the radiation dose. Therefore, it is possible to measure the radiation incident position and the radiation dose by counting the digital signals for each amplitude. The microcomputer 110 takes as inputs information about the radiation incident position and the radiation dose from the multichannel amplitude analyzer 109a, and additional information about the radiation incident position and the radiation dose from the multichannel amplitude analyzer 109b. Thereafter, the microcomputer 110 carries out the above sampled pattern matching method. That is, the pattern vector A is created depending upon the inputted radiation incident position and the inputted radiation dose. Each incident position corresponds to i of the element Ai in the pattern vector A, and the dose corresponds to |Ai|. Further, according to the above method, each pattern vector B is created to sequentially find a pattern vector B providing the maximum cosθ, and sequentially determine a position of the radiation source 101 corresponding to the found pattern vector B. In such a manner, it is possible to obtain a three-dimensional distribution of the radiation sources 101 in the monitored environment.

The radiation source distribution can be obtained so that a spatial radiation intensity distribution can easily be calculated. This depends upon the fact that radiation intensity is inversely proportional to the square of a distance from the radiation source 101. If an obstacle exists in the monitored environment, behavior of radiation due to the obstacle may previously be grasped, and the behavior of radiation due to the obstacle may be reflected in the calculated radiation intensity distribution.

The display 121 takes as inputs the radiation source distribution and the spatial radiation intensity distribution from the microcomputer 110, and indicates the distributions on demand.

Though the radiation source 101 is generally shielded so as not to leak radiation to the environment, radiation exceeding safety standard in quantity may leak to the environment due to some accident. In case of radiation leakage, the position of the radiation source 101 causing the radiation Leakage may be estimated as set forth above. It is thereby possible to rapidly and safely carry out a necessary action for the radiation leakage, for example, repair of a shielded portion. If the display 121 can indicate the result of estimation about the position of the radiation source 101, it is possible to more easily find the radiation leakage, and more rapidly carry out the necessary action.

Embodiment 2

In the first embodiment, the two scintillation fibers 102a and 102b are arranged as shown in FIG. 1. However, additional scintillation fibers may be arranged along edges on which the scintillation fibers 102a and 102b are not arranged.

Figure 4:
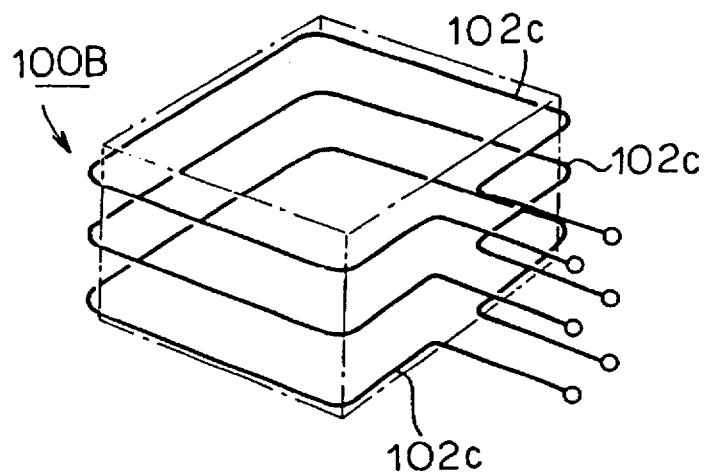
FIG. 4 is an explanatory view showing an illustrative arrangement of scintillation fibers according to the second embodiment of the present invention.
Figure 5:
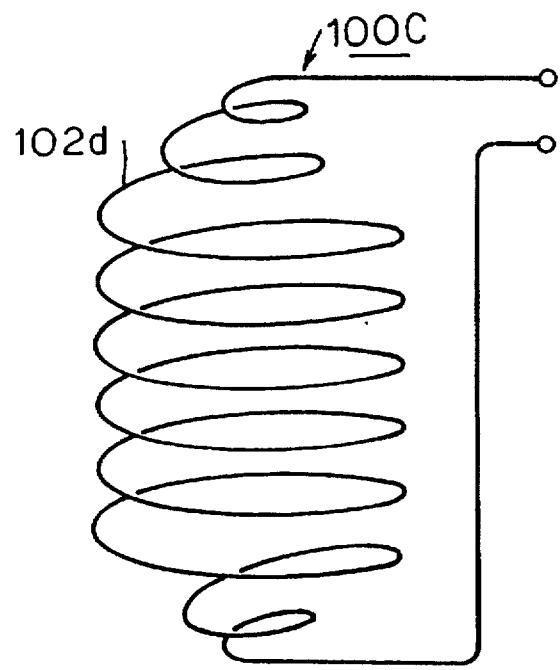
FIG. 5 is an explanatory view showing another arrangement of a scintillation fiber according to the second embodiment of the present invention.

Though the scintillation fibers may be arranged in an optional manner as long as positions thereof can be grasped, the scintillation fibers are preferably arranged to make an estimation error in a radiation distribution as small as possible. FIGS. 4 and 5 are explanatory views showing preferred embodiments of arrangement of scintillation fibers 102c and 102d. FIG. 4 illustrates a radiation detecting section 100B including a plurality of scintillation fibers 102c disposed at regular intervals. FIG. 5 illustrates a radiation detecting section 100C including one scintillation fiber 102d which is wound in a spiral fashion.

In this case, both ends of the scintillation fibers 102c and 102d are connected to a measuring portion as shown in FIG.

1, including photo detectors 103a to 103d, amplifiers 104a to 104d, constant fraction discriminators 105a to 105d, signal delay circuits 106a and 106b, time-to-amplitude converters 107a and 107b, A-D converters 108a and 108b, multichannel amplitude analyzers 109a and 109b, a microcomputer 110, a display 121, and so forth. The microcomputer 110 carries out inverse problem analysis.

Embodiment 3

Virtual reality may be applied to the radiation detector according to the first or second embodiment. That is, an estimated radiation distribution may be superimposed on an actual image of a monitored environment such as radiation controlled area. For example, a specific mark may be superimposed on an estimated position of a radiation source, or an image according to a radiation intensity distribution may be superimposed thereon. According to the method, in the radiation controlled area or the like, an operator can perform a repair job while checking the image in virtual reality display, resulting in more safe execution of the job.

Embodiment 4

Figure 6:
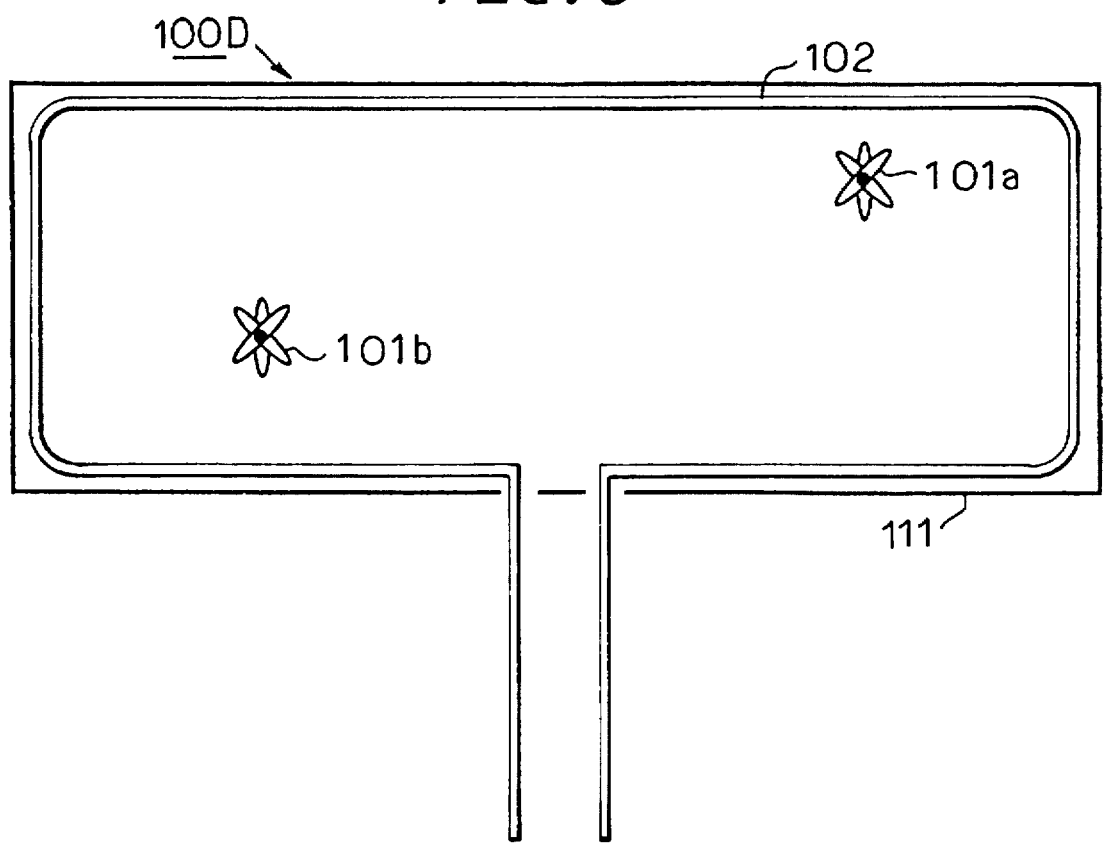
FIG. 6 is a plan view showing an essential part of a radiation detector according to the fourth embodiment of the present invention.

FIG. 6 is a plan view showing an essential part of a radiation detector according to the fourth embodiment of the present invention. In the drawing, reference numeral 102 means a scintillation fiber, and 101a and 101b are radiation sources which exist in an object area 111 for estimation of a radiation distribution. Reference numeral 100D means a radiation detecting section including the scintillation fiber 102.

Both ends of the scintillation fiber 102 are connected to a measuring portion as shown in FIG. 1. Therefore, a microcomputer 110 can execute the sampled pattern matching method by using information about a radiation incident position and the radiation dose in the scintillation fiber 102, and can estimate a two-dimensional radiation distribution in a monitored environment.

Though only the radiation distribution on the scintillation fiber can be detected by a conventional radiation detector, it is also possible in the embodiment to obtain the radiation distribution in a two-dimensional space.

Embodiment 5

Figure 7:
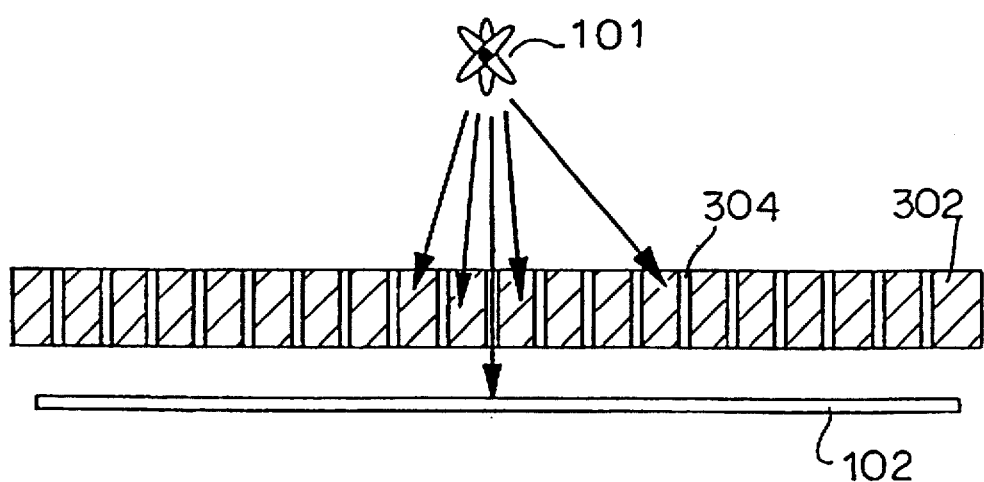
FIG. 7 is a sectional view showing the vicinity of a scintillation fiber in a radiation detector according to the fifth embodiment of the present invention.

FIG. 7 is a sectional view showing the vicinity of a scintillation fiber in a radiation detector according to the fifth embodiment of the present invention. In the drawing, reference numeral 102 means the scintillation fiber, 302 is a lead collimator, and 304 is a collimated hole. The collimator 302 is one example of radiation-oriented passing means. Both ends of the scintillation fiber 102 are connected to a measuring portion as shown in FIG. 1. Further, the scintillation fiber 102 is arranged in a two-dimensional or three-dimensional manner. A microcomputer 110 carries out inverse problem analysis.

A description will now be given of the operation.

Radiation is emitted from a radiation source 101 to spread out in four π directions, that is, in an isotropic manner. However, in the embodiment, since the lead collimator 302 is disposed on the side of the radiation source with respect to the scintillation fiber 102, almost the entire radiation to be incident on the scintillation fiber 102 passes through the collimated holes 304. Thus, the radiation toward the scintillation fiber 102 is incident in a direction substantially perpendicular to the scintillation fiber 102. According to the embodiment, a radiation detecting section including the scintillation fiber 102 and the collimator 302 has a directivity perpendicular to arrangement of the fiber. In this case, the measuring portion is operated as in the first embodiment.

When the collimator 302 is not disposed, radiation from the one radiation source 101 is incident on the scintillation fiber 102 from all directions. In other words, the radiation from the one radiation source 101 is incident on the scintillation fiber 102 through many positions. That is, the number of incident positions of radiation caused by the one radiation source 101 is increased, resulting in an increase in the number of variables used for the inverse problem analysis. However, when the radiation detecting section has the directivity as discussed in the embodiment, the number of incident positions of the radiation is decreased, resulting in a decrease in the number of variables for the inverse problem analysis. As a result, it is possible to reduce a time for analysis, and an error of the result of estimation about the position of the radiation source 101.

The structure shown in FIG. 7 can also be applied to the scintillation fiber in the first to fourth embodiments.

Embodiment 6

Figure 8A:
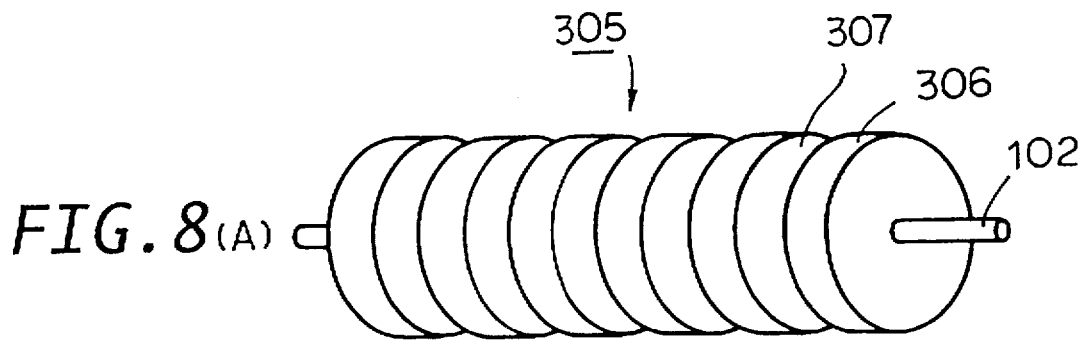
FIGS. 8(A) and 8(B) are perspective views showing the vicinity of a scintillation fiber in a radiation detector according to the sixth embodiment of the present invention.
Figure 8B:
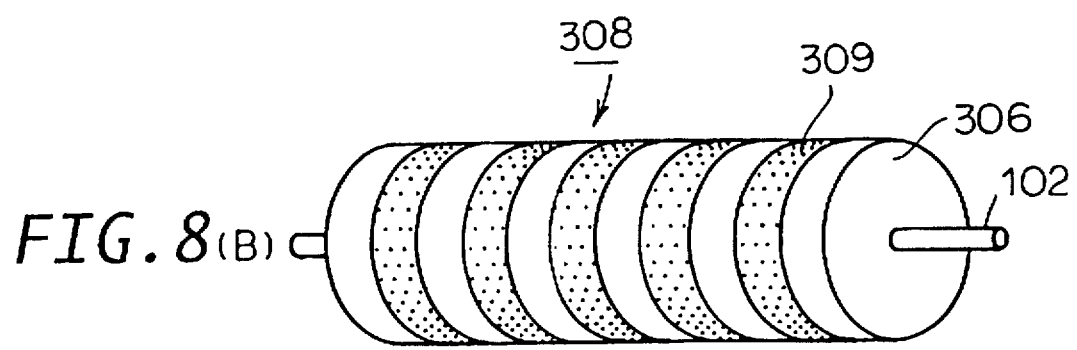
Figure 8C:
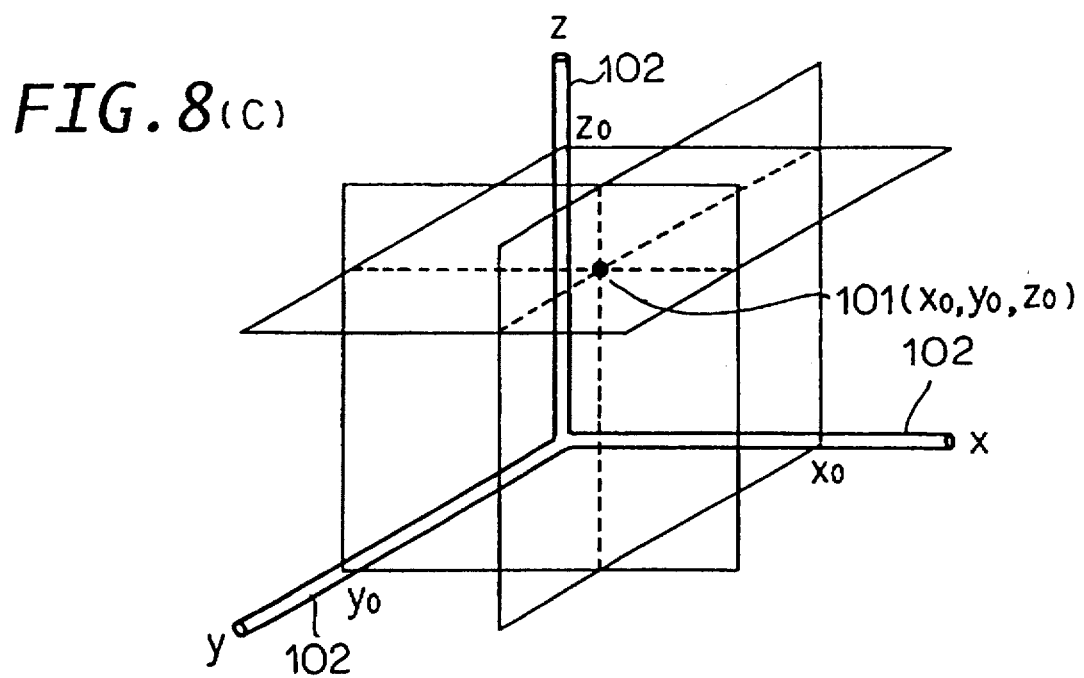
FIG. 8(C) is an explanatory view illustrating the operation of a collimator.

FIGS. 8(A) and 8(B) are perspective views showing the vicinity of scintillation fibers in radiation detectors according to the sixth embodiment of the present invention, and FIG. 8(C) is an explanatory view illustrating the operation of a collimator. In the drawings, reference numeral 305 means a collimator including a plurality of lead shields 306 disposed at regular gaps 307, and 308 is a collimator including the plurality of lead shields 306 disposed at regular gaps having materials 309 such as cellular plastics absorbing little radiation. The scintillation fiber 102 passes through centers of the collimators 305 and 308. Further, both ends of the scintillation fiber 102 are connected to a measuring portion as shown in FIG. 1. The scintillation fiber 102 is disposed in a two-dimensional or three-dimensional manner. A microcomputer 110 carries out inverse problem analysis. The collimators 305 and 308 are one examples of radiation-oriented passing means.

A description will now be given of the operation.

Since the shields 306 are disposed around the partial scintillation fiber 102, radiation is incident on the scintillation fiber 102 through only the gaps 307 or the materials 309 absorbing little radiation. That is, the scintillation fiber 102 has substantial sensitivity to only the radiation to enter through planes including the gaps 307 or the materials 309 absorbing little radiation. Further, the measuring portion is operated as in the first embodiment.

When the scintillation fibers 102 are disposed in the three-dimensional manner as shown in FIG. 8(C), a multichannel amplitude analyzer and the microcomputer can recognize an x-coordinate value $x_o$ of a radiation source 101 through the scintillation fiber 102 disposed in a direction of x-axis, a y-coordinate value $y_o$ of the radiation source 101 through the scintillation fiber 102 disposed in a direction of y-axis, and a z-coordinate value $z_o$ of the radiation source 101 through the scintillation fiber 102 disposed in a direction of z-axis. That is, it is possible to immediately recognize a position of the radiation source 101. Further, an incident position of the radiation is limited so that the number of variables for the inverse problem analysis is decreased. As a result, it is possible to reduce a time for analysis, and an error of the result of estimation about the position of the radiation source 101. If the shields 306 are interposed between the materials 309 absorbing little radiation as shown in FIG. 8(B), it is easy to maintain a structure of the collimator 308.

Structures shown in FIGS. 8A and 8B can be applied to the scintillation fibers in the first to fourth embodiments.

Embodiment 7

Figure 9:
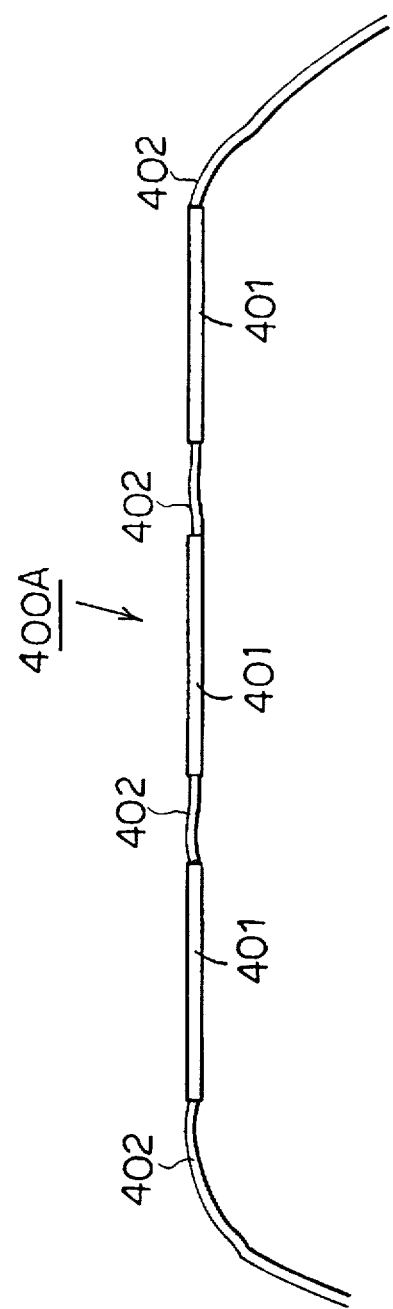
FIG. 9 is a front view showing an essential part of a radiation detector according to the seventh embodiment of the present invention.

FIG. 9 is a front view showing an essential part of a radiation detector according to the seventh embodiment of the present invention. In the drawing, reference numeral 401 means scintillation fibers forming radiation detecting portions, and 402 is transmission optical fibers to transmit a light pulse. A radiation detecting section 400A including the transmission optical fibers 402 and the scintillation fibers 401 is mounted in a monitored environment. Both ends of the radiation detecting section 400A are connected to a measuring portion as shown in FIG. 1. Further, the radiation detecting section 400A is disposed in a two-dimensional or three-dimensional manner. The transmission optical fiber 402 is made of material which causes no reaction with incident radiation.

A typical scintillation fiber has a high transmission loss. Thus, a long scintillation fiber results in a decreased quantity of light of a light pulse inputted into photo detectors which are mounted at both ends of the scintillation fiber. That is, it is difficult to measure a radiation distribution in a wide monitored environment by a single scintillation fiber. Consequently, as shown in FIG. 9, the plurality of scintillation fibers 401 having sensitivity to the radiation may alternately be connected to the plurality of transmission optical fibers 402 having no scintillation function so as to limit the length of one scintillation fiber 401. In such a manner, since it is enough to provide short scintillation fibers 401, the transmission loss due to the scintillation fiber 401 can be reduced. In this case, the measuring portion is operated as in the first embodiment.

In the above structure, the transmission loss of the light pulse does not increase even when the radiation detecting section is mounted in a wide range. It is thereby possible to realize multipoint measuring type of radiation monitoring in the wide monitored environment. "Multipoint measuring type" as used herein means a type in which the radiation detecting portions having the sensitivity to the radiation are discretely disposed in the radiation detecting section. According to the embodiment, it is not necessary to connect the photo detector for each scintillation fiber 401, resulting in cost reduction. In this case, an interval between the scintillation fibers 401 is determined according to resolution required to estimate a position of a radiation source, or to a radiation measuring range.

Preferably, a quartz series fiber having a low transmission loss is employed as the transmission optical fiber 402. A connection loss can be reduced by using a transmission optical fiber 402 having a core diameter identical with a diameter of the scintillation fiber 401, and having numerical aperture proximate to numerical aperture of the scintillation fiber 401. Further, silicone series adhesive is used to connect the scintillation fiber 401 to the transmission optical fiber 402. Alternatively, a connector having a low connection loss, such as F01 connector (Japanese Industrial Standard;JIS), may be used for connection.

Further, the radiation detecting section 400A shown in FIG. 9 may be applied to measurement of a one-dimensional radiation distribution. For the measurement of the one-dimensional radiation distribution, the radiation detecting section 400A is disposed in a one-dimensional manner. In this case, it is possible to employ the measuring portion shown in FIG. 21.

Embodiment 8

FIG. 10 is a front view showing an essential part of a radiation detector according to the eighth embodiment of the present invention. In the drawing, reference numeral 501 means photo detectors connected to both ends of a plurality of optical fiber sections including scintillation fibers 401 and transmission optical fibers 402 which are mutually connected. Like the optical fiber section in the seventh embodiment, the plurality of scintillation fibers 401 and the transmission optical fibers 402 having no scintillation function are alternately connected in each of the optical fiber sections. In this case, the optical fiber sections are disposed in a bundle manner to form one radiation detecting section 400B. The radiation detecting section 400B is formed such that a scintillation fiber 401 in one optical fiber section is not superimposed on a scintillation fiber 401 in another optical fiber section when viewed from the side of a radiation source.

An end of the photo detector 501 is connected to component parts in the measuring portion shown in FIG. 1 ahead of the photo detectors 103a to 103d, and the radiation detecting section 400B shown in FIG. 10 is arranged in a two-dimensional or three-dimensional manner. The measuring portion is operated as in the first embodiment.

In the above structure, like the seventh embodiment, a multichannel amplitude analyzer can obtain time information of a light pulse generated in each of the scintillation fibers 401. In this case, a narrower space is occupied by the scintillation fibers 401 in each optical fiber section. Therefore, a transmission loss in the scintillation fiber 401 does not increase, and multipoint measuring type of radiation monitoring can be made in a wider monitored environment. A length and the number of the scintillation fibers 401 are determined according to a length required for measurement.

Further, the radiation detecting section 400B shown in FIG. 10 can also be applied to measurement of a one-dimensional radiation distribution.

Embodiment 9

The radiation detecting sections 400A and 400B including the scintillation fibers 401 and the transmission optical fibers 402 are mounted in a monitored environment. However, a measuring portion as shown in FIG. 1 is mounted in an electromagnetically noiseless location such as a main control room in an atomic power plant. Thus, the transmission optical fiber 402 is extended from the monitored environment to, for example, the main control room in the atomic power plant. However, a light pulse generated by the scintillation fiber 401 has a trace quantity of light. Consequently, extension of a distance from the monitored environment to the measuring portion may result in reduction of the quantity of light of the light pulse in the transmission optical fiber 402. As a result, even when the measuring portion is mounted in the electromagnetically noiseless location such as the main control room in the atomic power plant, it is necessary to dispose the scintillation fiber 401 in the vicinity of the main control room. That is, only a limited range can be monitored.

In order to overcome the above problem, as shown in FIG. 11, a repeating amplifier 410 may be interposed between the transmission optical fibers 402 in a radiation detecting section 400C. The repeating amplifier 410 includes a light-electricity converter 411 to convert an optical pulse into an electric pulse, and an electricity-light converter 412 to convert the electric pulse into the optical pulse. The light-electricity converter 411 or the electricity-light converter 412, or both amplify an input signal. The transmission optical fiber 402 is connected to the electricity-light converter 412 to transmit an amplified optical pulse to the measuring portion. Though the repeating amplifier 410 is interposed between the transmission optical fibers 402 in FIG. 11, the repeating amplifier 410 may be interposed between the scintillation fibers 401.

In the above structure, a light pulse having sufficient information can be transmitted to the measuring portion even through a distance extended to the measuring portion from the monitored environment in which the radiation detecting section 400C is mounted. As a result, a wider range can be monitored. In this case, in order to avoid a loss of time information of the light pulse, a photo detector having a rapid rise time is used in the light-electricity converter 411, and a light source having a rapid rise time is used in the electricity-light converter 412. Further, the light-electricity converter 411 and the electricity-light converter 412 are preferably mounted in an environment having the smallest possible electromagnetic noise affection.

The above repeating amplifier 410 can also be applied to a radiation detector to measure a one-dimensional radiation distribution.

Embodiment 10

FIG. 12 is a front view showing an essential part of a radiation detector according to the tenth embodiment of the present invention. In the drawing, reference numeral 601 means a scintillation fiber bundle including a bundle of a plurality of scintillation fibers to form a radiation detecting portion, and 602 is transmission optical fiber bundles mounted on both sides of the scintillation fiber bundle 601, including a bundle of transmission optical fibers whose diameter is identical with that of the scintillation fiber. In a joint surface between the scintillation fiber bundle 601 and the transmission optical fiber bundle 602, the scintillation fiber corresponds to the transmission optical fiber in a one-to-one manner. Further, the scintillation fiber is connected to the transmission optical fiber through silicone series adhesive or a connector having a low connection loss such as F01 connector (JIS).

One end of each of the transmission optical fiber bundles 602 is connected to a measuring portion as shown in FIG. 1. Further, a radiation detecting section 600 including the scintillation fiber bundle 601 and the transmission optical fiber bundle 602 is arranged in a two-dimensional or three-dimensional manner.

Even when the radiation detecting section 600 has the above structure, it is possible to realize multipoint measuring type of radiation monitoring as in the seventh and eighth embodiments. Further, if the scintillation fibers are superimposed in the above manner, it is possible to increase the probability of interaction with high energy radiation in the scintillation fibers. This depends upon the fact that, even when the radiation passes through one scintillation fiber, fluorescence can be caused in other scintillation fibers. As a result, the radiation detector can have a more improved sensitivity to energy of the radiation. Additionally, since the plurality of scintillation fibers are tied in a bundle, when electrons are generated in the scintillation fiber in response to incident radiation, the electron can have a wider range in the scintillation fiber. As a result, a light pulse having an increased quantity of light can be generated by excitation action of molecules by the electrons.

The radiation detecting section 600 shown in FIG. 12 can also be applied to measurement of a one-dimensional radiation distribution.

Embodiment 11

FIG. 13 is a sectional view showing an essential part of a radiation detector according to the eleventh embodiment of the present invention. In the drawing, reference numeral 701 means a scintillation fiber bundle including a bundle of a plurality of scintillation fibers to form a radiation detecting portion, 702 is tapered light guides mounted to both ends of the scintillation fiber bundle 701, and 703 is transmission optical fibers. Unlike the tenth embodiment, in the embodiment, a light pulse is introduced through the light guide 702 to one of the transmission optical fibers 703. One end of each of the transmission optical fibers 703 is connected to a measuring portion as shown in FIG. 1. A radiation detecting section 700 including the scintillation fiber bundle 701, the light guides 702, and the transmission optical fibers 703 is disposed in a two-dimensional or three-dimensional manner. The light guide 702 is designed to have a shape through which the most possible quantity of light emitted from the scintillation fiber bundle 701 can be incident on the transmission optical fiber 703 in view of, for example, numerical aperture of the scintillation fiber bundle 701 and the transmission optical fibers 702. In this case, the measuring portion is operated as in the first embodiment.

As in the above embodiment, since the plurality of scintillation fibers are tied in a bundle, when electrons are generated in the scintillation fiber in response to the incident radiation, the electron can have a wider range in the scintillation fiber. As a result, a light pulse having an increased quantity of light can be generated by excitation action of molecules by the electrons. Subsequently, the light pulse having an increased quantity of light is incident on one of the transmission optical fibers 703. As in the above embodiment, it is possible to realize radiation measurement in a wider range. In addition, it is possible to increase the probability of interaction with high energy radiation in the scintillation fibers.

The radiation detecting section 700 shown in FIG. 13 can also be applied to measurement of a one-dimensional radiation distribution.

Embodiment 12

FIG. 14 is a sectional view showing a radiation detecting portion using scintillation fibers in a radiation detector according to the twelfth embodiment of the resent invention. In the drawing, reference numeral 1601 means the scintillation fibers. A scintillation fiber bundle 1605 includes a bundle of the plurality of scintillation fibers 1601 to form the radiation detecting portion. Reference numeral 1602 means wavelength shift optical fibers disposed around the scintillation fiber bundle 1605. Reference numeral 1603 means radiation, and 1604 is light pulses generated by fluorescence. The light pulse is emitted from a radiation detecting section 1600 including the scintillation fiber bundle 1605 and the wavelength shift optical fibers 1602, and is introduced into a measuring portion as shown in FIG. 1 through, for example, transmission optical fibers. Further, the radiation detecting section 1600 having the above structure is arranged in a two-dimensional or three-dimensional manner.

Almost the entire light pulse (typically, about 95% light pulse) generated in the scintillation fiber 1601 is incident on a clad wall at angles equal to or less than a critical angle of the scintillation fiber 1601, and is deflected to travel to the outside. Thus, there is a fear that a light pulse having a sufficient quantity of light can not be propagated to a photo detector through only the scintillation fiber 1601. In order to avoid reduction of the quantity of light of the light pulse, in the embodiment, the wavelength shift optical fibers 1602 causing no reaction with the radiation are disposed around the scintillation fibers 1605.

A description will now be given of the operation.

At a time of incidence of the radiation 1603, a light pulse is generated in the scintillation fiber 1601. Among the generating light pulses, some light pulses 1604 are not captured in the scintillation fiber 1601 to travel to the outside of the scintillation fiber 1601, and are incident on the wavelength shift optical fibers 1602 disposed around the scintillation fiber bundle 1605. The wavelength shift optical fiber 1602 is filled with a scintillator to absorb light having a wavelength identical with that of the light pulse 1604, and emit a light pulse having a longer wavelength than that of the absorbed light. Thus, the wavelength shift optical fiber 1602 causes fluorescence in response to incidence of the light pulse 1604, thereby generating a light pulse having a longer wavelength than that of the light pulse 1604. In such a manner, the light pulse leaving the scintillation fiber 1601 is captured again so that a large quantity of light can be propagated to the photo detector. In this case, the measuring portion is operated as in the first embodiment.

There is a difference in wavelength between the light pulse propagated through the scintillation fiber 1601 and the light pulse propagated through the wavelength shift optical fiber 1602. However, both ends of the scintillation fiber 1601 may be connected to wavelength shift optical fibers of the same type as that of the wavelength shift optical fiber 1602. It is thereby possible to feed the measuring portion with a light pulse having the same wavelength.

The radiation detecting section 1600 shown in FIG. 14 can also be applied to measurement of a one-dimensional radiation distribution.

Embodiment 13

FIG. 15 is a sectional view showing an essential part of a radiation detector according to the thirteenth embodiment of the present invention. In the drawing, reference numeral 801 means a scintillation fiber bundle formed by a bundle of a plurality of optical fibers including scintillation fibers, and 803 is a light guide to concentrate on a wavelength shift optical fiber 804 a light pulse 802 emitted from the scintillation fiber bundle 801 forming a radiation detecting portion. The wavelength shift optical fiber 804 absorbs the light pulse from the light guide to generate a light pulse having a longer wavelength than that of the absorbed light. The wavelength shift optical fiber 804 also serves as a transmission optical fiber through which the light pulse is propagated to a photo detector. The wavelength shift optical fiber 804 is partially inserted into the light guide 803. Further, as the light guide 803, it is possible to employ an acrylic workpiece with an outer periphery to which a reflecting film is applied, or a conical mirror surface.

Though FIG. 15 illustrates the connection structure on one side of a radiation detecting section 800A, it is to be noted that the same connection structure is mounted on the other side.

In case of multipoint measurement, as shown in FIG. 10, the scintillation fiber bundle 801 includes a bundle of optical fiber sections in which one scintillation fiber is combined with a transmission optical fiber. In each optical fiber section, the scintillation fiber is mounted at a position deviated from positions of the scintillation fibers in other optical fiber sections. In the radiation detecting section 800A including the scintillation fiber bundle 801, the light guides 803, and the wavelength shift optical fibers 804, the light pulse from the wavelength shift optical fiber 804 is introduced into a measuring portion as shown in FIG. 1. The radiation detecting section 800A having the above structure is arranged in a two-dimensional or three-dimensional manner.

A description will now be given of the operation.

The light pulses 802 are emitted from the scintillation fiber bundle 801, and are incident on the wavelength shift optical fiber 804 while being reflected off a wall surface of the light guide 803 or in a direct manner. The wavelength shift optical fiber 804 is filled with a scintillator to absorb light having the same wavelength as that of the light pulse 802 from the scintillation fiber bundle 801 so as to generate a light pulse having a longer wavelength than that of the absorbed light. Therefore, it is possible to generate the light pulse having a longer wavelength than that of the light pulse 802 whether the light pulse 802 is incident on the wavelength shift optical fiber 804 through its end surface or its side surface.

That is, independently of numerical aperture, the wavelength shift optical fiber 804 can efficiently receive the light pulse from the scintillation fiber bundle 801, and can propagate the light pulse to the photo detector. Since the light pulse can efficiently be propagated, it is possible to measure radiation in a wider monitored environment. In this case, the measuring portion is operated as in the first embodiment.

The light pulse from the scintillation fiber bundle 801 is used to obtain time information. Consequently, since the time information should accurately be fed to the measuring portion, it is necessary to avoid a significant variation in waveform of the light pulse. Thus, the wavelength shift optical fiber 804 is inserted into the light guide 803 with a shorter depth. In this state, the light pulses emitted from the scintillation fiber bundle 801 can be incident on the end surface or the side surface of the wavelength shift optical fiber 804 with substantially no difference in transmission time. As a result, in the light pulse generated according to the scintillation action in the wavelength shift optical fiber 804, the waveform is not largely expanded.

When fluorescence is caused in the wavelength shift optical fiber 804, optical pulses are isotropically expanded by the fluorescence. That is, some light pulses travel toward the scintillation fiber bundle 801. For the light pulses, a reflecting film is mounted to an end surface of the waveform shift optical fiber 804 on the side of the scintillation fiber bundle 801. The light pulses travelling toward the scintillation fiber bundle 801 are sent back by the reflecting film into the waveform shift optical fiber 804 again. In such a manner, it is possible to increase a quantity of light of the light pulse transmitted to the measuring portion.

Since the above waveform shift optical fiber 804 typically has a high transmission loss, the wavelength shift optical fiber 804 may be connected to a transmission optical fiber having a diameter identical with a core diameter of the wavelength shift optical fiber 804, numerical aperture as closely as possible to numerical aperture thereof, and a low transmission loss. In this case, the light pulse from the waveform shift optical fiber 804 can be propagated through the transmission optical fiber to the measuring portion.

The scintillation fiber bundle 801 may simply be connected to one transmission optical fiber such that light emitted from the scintillation fiber bundle 801 can be incident on the transmission optical fiber. However, in this structure, the quantity of light of the light pulse incident on the transmission optical fiber is limited due to a difference between the fibers in, for example, numerical aperture, or core diameter. According to the connection structure in the embodiment, it is possible to enhance an efficiency of incidence of the light pulse on the waveform shift optical fiber 804 also serving as the transmission optical fiber.

The radiation detecting section 800A shown in FIG. 15 can also be applied to measurement of a one-dimensional radiation distribution.

Embodiment 14

FIG. 16 is a sectional view showing an essential part of a radiation detector according to the fourteenth embodiment of the present invention. In the drawing, reference numeral 901 means radiation incident on a scintillation fiber, 902, 903, and 904 are light pulses generated in response to the incident radiation 901 in a scintillation fiber bundle 801, and 905, 906, 907, and 908 are light pulses generated by a wavelength shift optical fiber 804 in response to the incident light pulses 902 and 903. Reference numeral 909 means an optical absorbent applied to an outer periphery of the wavelength shift optical fiber 804. In the embodiment, the wavelength shift optical fiber 804 passes through the scintillation fiber bundle 801. The light pulse from a radiation detecting section 800B shown in FIG. 16 is introduced to a measuring portion as shown in FIG. 1. The radiation detecting section 800B having the above structure is arranged in a two-dimensional or three-dimensional manner.

A description will now be given of the operation.

The radiation 901 is incident on the scintillation fiber bundle 801 to cause fluorescence in the scintillation fiber bundle 801, thereby generating the light pulses 902, 903, and 904. The light pulses 902 and 903 are propagated through the scintillation fiber in mutually opposite directions. The light pulses 902 and 903 propagated through the scintillation fiber bundle 801 are respectively reflected off an outer wall of a light guide 803 several times, and are incident on the wavelength shift optical fiber 804. As in the thirteenth embodiment, the wavelength shift optical fiber 804 converts wavelengths of the incident light pulses 902 and 903 to generate the light pulses 905, 906, 907, and 908. In this case, the measuring portion is operated as in the first embodiment.

Position information of the incident radiation 901 is contained in the light pulses 905 and 907 travelling in directions identical with propagation directions of the light pulses 902 and 903. That is, erroneous position information may be fed to the measuring portion due to the light pulses 906 and 908 travelling in directions opposed to the propagation directions of the light pulses 902 and 903. However, it can be seen that only a minor error is caused in position resolution required for the radiation detector.

It is impossible to connect both the scintillation fiber bundles 801 shown in the thirteenth embodiment through an optical fiber. This is because, in the connection, the light pulse emitted from the wavelength shift optical fiber 804 is difficult to pass through the scintillation fiber bundle 801 in the next step, and subsequently enter the wavelength shift optical fiber 804 in the step after next. Even when the light pulse can be incident on the wavelength shift optical fiber 804 in the step after next, light is weak.

In the embodiment, as shown in FIG. 16, the wavelength shift optical fiber 804 passes through the scintillation fiber bundle 801. Consequently, a plurality of scintillation fiber bundles 801 can be connected through the wavelength shift optical fiber 804 also serving as a transmission optical fiber. If some scintillation fiber bundles 801 are connected through the transmission optical fiber, multipoint measuring type of radiation monitoring can be made in a wider monitored environment.

The light pulse 904 is incident on a clad wall at angles equal to or less than a critical angle of the scintillation fiber bundle 801, and is deflected to travel to the outside. Among the light pulses generated by the fluorescence in the scintillation fiber bundle 801, almost the entire light pulse (typically, about 95% light pulse) isotropically leaves the scintillation fiber bundle 801 like the light pulse 904. Therefore, some light pulses 904 are incident, at positions apart from positions of generation thereof, on the wavelength shift optical fiber 804 through a wall surface of the wavelength shift optical fiber 804.

Fluorescence is caused by the light pulse 904 incident on the wavelength shift optical fiber 804 through its wall surface. When a light pulse is caused by the fluorescence, and is propagated through the wavelength shift optical fiber 804, erroneous position information of radiation is transferred to the measuring portion. Then, an optical absorbent 909 is applied to an outer periphery of the wavelength shift optical fiber 804 at a position in contact with the scintillation fiber bundle 801. The optical absorbent 909 can prevent the light pulse 904 from entering the wavelength shift optical fiber 804. It is thereby possible to avoid transmission of the erroneous information about radiation position.

The radiation detecting section 800B shown in FIG. 16 can also be applied to measurement of a one-dimensional radiation distribution.

Embodiment 15

FIG. 17 is a sectional view showing an essential part of a radiation detector according to the fifteenth embodiment of the present invention. As shown in the drawing, a wavelength shift optical fiber 804 is wound in a spiral manner in a light guide 803. A radiation detecting section 800C having the above structure is arranged in a two-dimensional or three-dimensional manner.

The radiation detector in the embodiment is operated as in the radiation detector in the thirteenth embodiment. However, in the embodiment, the wavelength shift optical fiber 804 can have a larger surface area in the light guide 803. Therefore, a light pulse emitted from a scintillation fiber bundle 801 can more efficiently be incident on the wavelength shift optical fiber 804 than would be in the thirteenth embodiment.

The embodiment can also be applied to measurement of a one-dimensional radiation distribution. Further, instead of the scintillation fiber bundle used in the twelfth to fifteenth embodiments, a reflector may be applied to an outer surface of a solid scintillator. In this case, a large quantity of light can efficiently be propagated.

Embodiment 16

FIG. 18 is a sectional view showing an essential part of a radiation detector according to the sixteenth embodiment of the present invention. In the drawing, reference numeral 1201 means a reflector layer applied to or evaporated onto an outer periphery of a cladding 1208 of a scintillation fiber 1606. In the reflector layer 1201, it is possible to employ titanium oxide, aluminum, or synthetic resin, such as sold under the trademark Teflon, as a reflector. Reference numeral 1202 means a light pulse among light pulses generated by incidence of radiation 901, which is totally reflected off an interface between a core 1207 and the cladding 1208 of the scintillation fiber 1206, and 1203 is a light pulse deflected to travel to the outside without total reflection. Reference numeral 1204 means a light pulse among the light pulse 1203, which is incident on the core 1207 of the scintillation fiber 1206 again due to scattering or reflection at the reflector layer 1201, and 1205 is light pulses which are generated to have a longer wavelength than that of the light pulse 1204 by a scintillator material in the core 1207 absorbing the light pulse 1204. The light pulses are propagated through the scintillation fiber 1206 to be introduced to a measuring portion as shown in FIG. 1. A radiation detecting section 1200 having the above structure is arranged through, for example, a transmission optical fiber in a two-dimensional or three-dimensional manner. Alternatively, the structure shown in FIG. 18 and the transmission optical fibers may alternately be connected, and this structure may be arranged in the two-dimensional or three-dimensional manner.

A description will now be given of the operation.

When the radiation 901 is incident on the scintillation fiber 1206, fluorescence is caused in the core 1207 to generate the light pulses. If the scintillation fiber 1206 is made of plastic, only about 5% light pulses among the entire light pulses extending isotropically are propagated through the core 1207 after total reflection at the interface between the core 1207 and the cladding 1208.

The remaining light pulse 1203 is not totally reflected, and is deflected to leave the cladding 1208. However, in the embodiment, the reflector layer 1201 causes scattering or regular reflection of the light pulse 1203 to leave the cladding, and moves the light pulse 1203 back into the core 1207 of the scintillation fiber 1206 as the light pulse 1204 again.

The initially generating light pulse in response to incidence of the radiation 901 is light having a short wavelength of about two hundred and several tens nanometers. Thus, it is highly possible that the light pulse is immediately absorbed in the core 1207. In order to avoid the absorption, the core 1207 typically includes several types of wavelength shift scintillator materials. It is thereby possible to shift a wavelength of the light pulse 1203 to the long wavelength side. When the light pulse 1203 is incident on the cladding 1208 before the completion of wavelength shift, the light pulse 1203 is scattered or reflected at the reflector layer 1201 to be incident on the core 1207 as the light pulse 1204 again. The light pulse 1204 is absorbed by the scintillator material in the core 1207. The scintillator material generates light pulses 1205 which extend isotropically.

Among the light pulses 1205, some light pulses are totally reflected off the interface between the core 1207 and the cladding 1208. Consequently, an increased quantity of light of the light pulses can finally be confined within the core 1207 of the scintillation fiber 1206, thereby improving sensitivity of a radiation detecting portion to the radiation 901. As a result, it is possible to realize radiation monitoring in a wider monitored environment. In this case, a measuring portion is operated as in the first embodiment.

When the scintillation fiber 1206 is extremely short, the light pulse 1204 from the reflector layer 1201 can reach an end of the scintillation fiber 1206 even if wavelength shift of the light pulse 1203 is completed. In this case, the sensitivity is more enhanced.

The radiation detecting section 1200 shown in FIG. 18 can also be applied to measurement of a one-dimensional radiation distribution.

Embodiment 17

FIG. 19 is a sectional view showing an essential part of a radiation detector according to the seventeenth embodiment of the present invention. In the drawing, reference numeral 1301 means a scintillation fiber forming a radiation detecting portion, and 1302 is a transmission optical fiber to transmit a light pulse generated in the scintillation fiber 1301. In the embodiment, in order to form a radiation detecting section 1300A, processing such as twisting is made to a bundle of optical fiber sections in which the plurality of scintillation fibers 1301 are connected to the plurality of transmission optical fibers 1302. The radiation detecting section 1300A has such a structure that one scintillation fiber 1301 is present together with another scintillation fiber 1301 as viewed in a direction perpendicular to a propagation direction of the light pulse. Light pulses from both ends of the radiation detecting section 1300A are introduced to a measuring portion as shown in FIG. 1. The radiation detecting section 1300A having the above structure is arranged in a two-dimensional or three-dimensional manner.

The radiation detector is provided with the radiation detecting section 1300A having the above structure, and is operated as in the tenth embodiment shown in FIG. 12. However, in the embodiment, in the extending direction of the radiation detecting section 1300A there are many points where scintillation fibers 1301 exist respectively. As a result, it is possible to realize radiation monitoring in a wider monitored environment. Further, as in the tenth embodiment, it is possible to increase the probability of interaction with high energy radiation in the scintillation fiber 1301. That is, the radiation detecting section can have more improved sensitivity to radiation energy. In this case, the measuring portion is operated as in the first embodiment.

The radiation detecting section 1300A shown in FIG. 19 can also be applied to measurement of a one-dimensional radiation distribution.

Embodiment 18

FIG. 20 is a sectional view showing an essential part of a radiation detector according to the eighteenth embodiment of the present invention. As in the seventeenth embodiment, in order to form a radiation detecting section 1300B, processing such as twisting is made to a bundle of optical fiber sections in which a plurality of scintillation fibers 1301 are connected to a plurality of transmission optical fibers 1302. However, unlike the seventeenth embodiment, the radiation detecting section 1300B has no portion without the scintillation fiber 1301 in a propagation direction of a light pulse.

The radiation detector is provided with the radiation detecting section 1300B having the above structure, and is operated as in the seventeenth embodiment shown in FIG. 19. However, since the radiation detecting section 1300B includes no portion without the scintillation fiber 1301 in the embodiment, continuous distribution measurement can be realized instead of multipoint radiation measurement.

The radiation detecting section 1300B shown in FIG. 20 can also be applied to measurement of a one-dimensional radiation distribution.

As set forth above, there is provided the radiation detector in which the scintillation fiber is arranged in the two-dimensional or three-dimensional manner. Consequently, it is possible to measure the two-dimensional radiation distribution or the three-dimensional radiation distribution. As a result, the radiation monitoring can be facilitated in, for example, the radiation controlled area.

Further, there is provided the radiation detector including the analyzing means for carrying out the inverse problem analysis depending upon the incident position of radiation and the radiation dose rate at the incident position, and estimating the radiation source or the spatial radiation intensity distribution. As a result, it is possible to obtain the two-dimensional or three-dimensional radiation source distribution or radiation intensity distribution so as to rapidly and safely carry out the necessary action for the radiation leakage.

Further, there is provided the radiation detector in which the radiation detecting section including the scintillation fiber and the transmission optical fiber is arranged in the one-dimensional manner. As a result, it is possible to obtain the incident position of radiation and the radiation dose rate at the incident position in a wider range.

Further, there is provided the radiation detector radiation including the radiation-oriented passing means for passing radiation in the direction perpendicular to the longitudinal direction of the scintillation fiber. Consequently, the number of incident positions of the radiation is decreased in the radiation detecting section. As a result, since the number of variables used for the inverse problem analysis is decreased, it is possible to decrease the time for analysis, and the error of the result of estimation about the position of the radiation source.

Further, there is provided the radiation detector including the radiation detecting section in which the scintillation fiber is connected to the transmission optical fiber causing no reaction with radiation. As a result, it is possible to reduce a loss of the light pulse generated in the scintillation fiber, and realize the radiation measurement in a wider range.

Further, there is provided the radiation detector including the radiation detecting section with the repeating amplifier mounted in the course thereof to amplify the light pulse. It is thereby possible to compensate for a loss of the light pulse generated in the scintillation fiber, and extend the transmission optical fiber. As a result, it is possible to mount the measuring portion in the radiation detector at a position apart from the radiation detecting section.

Further, there is provided the radiation detector including the radiation detecting section having the scintillation fiber bundle in which the plurality of scintillation fibers are bundled, and having the transmission optical fibers connected to both the ends of the scintillation fiber bundle. As a result, it is possible to increase the probability of interaction with high energy radiation in the scintillation fiber, and improve the sensitivity to the radiation energy.

Further, there is provided the radiation detector including the radiation detecting section having the light guides connected to both the ends of the scintillation fiber, and the wavelength shift optical fibers inserted into the other ends of the light guides. As a result, it is possible to focus the light pulse from the scintillation fiber on the transmission optical fiber at high efficiency, and realize the radiation measurement in a wider range.

Further, there is provided the radiation detector in which the reflector layer is mounted on the outer periphery of the cladding of the scintillation fiber. As a result, though some light pulses are going to leave the cladding among the light pulses generated by radiation, it is possible to move the light pulses back into the core again, and increase the quantity of light captured in the scintillation fiber. That is, it is possible to realize the radiation measurement in a wider range.

Further, there is provided the radiation detector including the radiation detecting section having an alternate connection of the scintillation fibers and the transmission optical fibers. In the radiation detecting section, the plurality of alternate connections are tied in a bundle such that the plurality of scintillation fibers are present in the direction perpendicular to the propagation direction of the light pulse. As a result, it is possible to increase the probability of interaction with the high energy radiation in the scintillation fiber, and propagate the light pulse generated in the scintillation fiber to the photo detector with low losses.

Further, there is provided the radiation detector including the radiation detecting section in which the wavelength shift optical fiber connected to the light guide is spirally wound in the light guide. As a result, it is possible to focus the light pulse from the scintillation fiber on the transmission optical fiber at higher efficiency, and realize the radiation measurement in a wider range.

Further, there is provided the method of detecting radiation, in which the inverse problem analysis is carried out by using the pattern vector and the calculation pattern vector depending upon the measured radiation intensity distribution. As a result, it is possible to obtain the spatial two-dimensional or three-dimensional radiation source distribution.

Further, there is provided the method of detecting radiation, in which the spatial radiation intensity distribution is calculated depending upon the two-dimensional or three-dimensional radiation source distribution, and is displayed. As a result, the operator can receive the two-dimensional or three-dimensional spatial radiation intensity distribution, and can rapidly and safely carry out the necessary action for the radiation leakage.

What is claimed is:

1. A radiation detector comprising:

scintillator fibers responsive to radiation to generate light pulses, photo detectors receiving the light pulses, propagated in two directions, from the scintillator fibers and converting the light pulses into electric pulses; and radiation analyzers responsive to the electric pulses to determine an incident position of the radiation and a radiation dose rate at the incident position depending upon a difference in arrival time between the electric pulses from the photo detectors and the number of electric pulses, and analyzing means for carrying out inverse problem analysis depending upon the incident position of radiation and the radiation dose rate at the incident position found by the radiation analyzers, and estimating a radiation source distribution or a spatial radiation intensity distribution; and wherein a radiation detecting section including the scintillation fibers is arranged in a two-dimensional or three-dimensional manner.

2. A radiation detector comprising:

photo detectors receiving light pulses, propagated in two directions, from a radiation detecting section and converting the light pulses into electric pulses;

radiation analyzers responsive to the electric pulses to determine an incident position of the radiation and a radiation dose rate at the incident position depending upon a difference in arrival time between the electric pulses from the photo detectors and the number of electric pulses; and, wherein the radiation detecting section comprises a scintillation fiber bundle, wave length shift optical fibers, and light guides, each of the light guides having one end connected to a respective end of the scintillation fiber bundle and another end connected to one of the wavelength shift optical fibers.

3. A radiation detector according to claim 2, wherein the wavelength shift optical fiber connected to the light guide is spirally wound in the light guide.

4. A radiation detector comprising:

scintillator fibers responsive to radiation to generate light pulses, photo detectors receiving the light pulses, propagated in two directions, from the scintillator fibers and converting the light pulses into electric pulses;

radiation analyzers responsive to the electric pulses to determine an incident position of the radiation and a radiation dose rate at the incident position depending upon a difference in arrival time between the electric pulses from the photo detectors and the number of electric pulses;

wherein a radiation detecting section including the scintillation fibers is arranged in a two-dimensional or three-dimensional manner; and wherein a radiation detecting section comprises radiation detecting portion including scintillation fiber, and transmission optical fiber connected to the radiation detecting portion, for transmitting a light pulse and causing no reaction with the radiation;

and wherein a reflector layer is mounted on an outer periphery of a cladding of the scintillation fiber.

5. A radiation detector comprising:

scintillator fibers responsive to radiation to generate light pulses, photo detectors receiving the light pulses propagated in two directions, from the scintillator fibers and converting the light pulses into electric pulses; and radiation analyzers responsive to the electric pulses to determine an incident position of the radiation and a radiation dose rate at the incident position depending upon a difference in arrival time between the electric pulses from the photo detectors and the number of electric pulses;

wherein a radiation detecting section including the scintillation fibers is arranged in a two-dimensional or three-dimensional manner; and wherein a radiation detecting section comprises radiation detecting portion including scintillation fiber, and transmission optical fiber connected to the radiation detecting portion, for transmitting a light pulse and causing no reaction with the radiation; and wherein the radiation detecting section includes a bundle of a plurality of portions, each portion having scintillation fibers and the transmission optical fibers connected alternately, and the plurality of portions being tied in a bundle such that the plurality of scintillation fibers are present in a direction perpendicular to a propagation direction of the light pulse.

6. A radiation detector comprising:

scintillator fibers responsive to radiation to generate light pulses, photo detectors receiving the light pulses, propagated in two directions, from the scintillator fibers and converting the light pulses into electric pulses;

radiation analyzers responsive to the electric pulses to determine an incident position of the radiation and a radiation dose rate at the incident position depending upon a difference in arrival time between the electric pulses from the photo detectors and the number of electric pulses;

wherein a radiation detecting section including the scintillation fibers is arranged in a two-dimensional or three-dimensional manner: and wherein a radiation detecting section comprises radiation detecting portion including scintillation fiber, and transmission optical fiber connected to the radiation detecting portion, for transmitting a light pulse and causing no reaction with the radiation; and wherein the radiation detecting section includes a bundle of a plurality of portions, each portion having scintillation fibers and the transmission optical fibers connected alternately, and the plurality of portions being tied in a bundle such that each scintillation fiber on each portion does not overlap with other scintillation fibers in a direction perpendicular to a propagation direction of the light pulse.

7. A radiation detector comprising:

scintillator fibers responsive to radiation to generate light pulses, photo detectors receiving the light pulses, propagated in two directions, from the scintillator fibers and converting the light pulses into electric pulses; and radiation analyzers responsive to the electric pulses to determine an incident position of the radiation and a radiation dose rate at the incident position depending upon a difference in arrival time between the electric pulses from the photo detectors and the number of electric pulses, and;

wherein a radiation detecting section including the scintillation fibers is arranged in a two-dimensional or three-dimensional manner;

and wherein a radiation detecting section has a repeating amplifier mounted in the course of the radiation detecting section, to amplify a light pulse.

8. A method of detecting radiation, used in a radiation detector including:

photo detectors to convert into electric pulses light pulses propagated in two directions from scintillation fibers to detect radiation and generate the light pulses;

radiation analyzers to find an incident position of the radiation and a radiation dose rate at the incident position depending upon a difference in arrival time between the electric pulses from the photo detectors and the number of electric pulses; and analyzing means for carrying out inverse problem analysis depending upon the found incident position of radiation and the found radiation dose rate at the incident position, and estimating a radiation source distribution or a spatial radiation intensity distribution, the method comprising the steps of:

measuring a radiation intensity distribution around an object area divided into a plurality of elements so as to create a pattern vector according to the radiation intensity distribution;

calculating a calculation pattern vector of a radiation intensity distribution which must be measured assuming that a radiation source exists at a center of each of the elements;

determining a position of a radiation source which is assumed when the calculation pattern vector is generated to have a direction proximate to a direction of the pattern vector according to the measured radiation intensity distribution; and creating a two-dimensional or three-dimensional radiation source distribution in the object area depending upon the determined positions of the radiation sources.

9. A method of detecting radiation according to claim 8, wherein the spatial radiation intensity distribution is calculated depending upon the two-dimensional or three-dimensional radiation source distribution to display the calculated radiation intensity distribution.

10. A radiation detector comprising:

photo detectors to convert into electric pulses light pulses propagated in two directions from scintillation fibers to detect radiation and generate the light pulses; and radiation analyzers to find an incident position of the radiation and a radiation dose rate at the incident position depending upon a difference in arrival time between the electric pulses from the photo detectors and the number of electric pulses, wherein a radiation detecting section including scintillation fibers is arranged in a one-dimensional manner; and wherein said radiation detecting section has a repeating amplifier mounted in the course of the radiation detecting section, to amplify a light pulse.

11. A radiation detector comprising:

photo detectors receiving light pulses, propagated in two directions, from a radiation detecting section and converting the light pulses into electric pulses;

radiation analyzers responsive to the electric pulses to determine an incident position of the radiation and a radiation dose rate at the incident position depending upon a difference in arrival time between the electric pulses from the photo detectors and the number of electric pulses;

wherein the radiation detecting section is arranged in a one-dimensional manner; and wherein the radiation detecting section comprises a fiber bundle including a plurality of scintillation fibers and a plurality of transmission optical fibers; and a plurality of light guides, each of the light guides having one end connected to a respective end of the fiber bundle and another connected to a wavelength shift optical fiber.

12. A radiation detector according to claim 11, wherein the wavelength shift optical fiber connected to the light guide is spirally wound in the light guide.

13. A radiation detector comprising:

photo detectors to convert into electric pulses light pulses propagated in two directions from scintillation fibers to detect radiation and generate the light pulses; and radiation analyzers to find an incident position of the radiation and a radiation dose rate at the incident position depending upon a difference in arrival time between the electric pulses from the photo detectors and the number of electric pulses, wherein a radiation detecting section is arranged in a one-dimensional manner, wherein said radiation detecting section comprises radiation detecting portion including scintillation fiber and transmission optical fiber connected to the radiation detecting portion, for transmitting a light pulse and causing no reaction with the radiation, and wherein a reflector layer is mounted on an outer periphery of a cladding of the scintillation fiber.

14. A radiation detector comprising:

photo detectors to convert into electric pulses light pulses propagated in two directions from scintillation fibers to detect radiation and generate the light pulses; and radiation analyzers to find an incident position of the radiation and a radiation dose rate at the incident position depending upon a difference in arrival time between the electric pulses from the photo detectors and the number of electric pulses, wherein a radiation detecting section is arranged in a one-dimensional manner, and wherein the radiation detecting section includes a bundle of a plurality of portions, each portion having scintillation fibers and the transmission optical fibers connected alternately, and the plurality of portions being tied in a bundle such that the plurality of scintillation fibers are present in a direction perpendicular to a propagation direction of the light pulse.

15. A radiation detector comprising:

photo detectors to convert into electric pulses light pulses propagated in two directions from scintillation fibers to detect radiation and generate the light pulses; and radiation analyzers to find an incident position of the radiation and a radiation dose rate at the incident position depending upon a difference in arrival time between the electric pulses from the photo detectors and the number of electric pulses, wherein a radiation detecting section is arranged in a one-dimensional manner, and wherein the radiation detecting section includes a bundle of a plurality of portions, each portion having scintillation fibers and the transmission optical fibers connected alternately, and the plurality of portions being tied in a bundle such that each scintillation fiber on each portion does not overlap with other scintillation fibers in a direction perpendicular to a propagation direction of the light pulse.

* * * * *